(12) United States Patent
Palmer et al.

(10) Patent No.: US 8,334,634 B2
(45) Date of Patent: Dec. 18, 2012

(54) HIGH POWER ROTARY DEVICE

(75) Inventors: Robert A. Palmer, Fordland, MO (US); Denis L. Palmer, Brigham City, UT (US)

(73) Assignee: Millennial Research Corporation, Bixby, OK (US)

( * ) Notice: Subject to any disclaimer, the term of this patent is extended or adjusted under 35 U.S.C. 154(b) by 0 days.

(21) Appl. No.: 13/488,321

(22) Filed: Jun. 4, 2012

(65) Prior Publication Data

US 2012/0242177 A1 Sep. 27, 2012

Related U.S. Application Data

(63) Continuation of application No. 12/752,548, filed on Apr. 1, 2010, now Pat. No. 8,193,669, which is a continuation of application No. 11/460,149, filed on Jul. 26, 2006, now Pat. No. 7,719,147.

(51) Int. Cl.
*H02K 1/22* (2006.01)

(52) U.S. Cl. .................................... 310/268; 310/266
(58) Field of Classification Search ............... 310/266, 310/267, 268
See application file for complete search history.

(56) References Cited

U.S. PATENT DOCUMENTS

| | | | | |
|---|---|---|---|---|
| 5,184,040 A | * | 2/1993 | Lim | 310/114 |
| 6,841,916 B2 | * | 1/2005 | Chiarenza | 310/254.1 |
| 7,298,063 B2 | * | 11/2007 | Cunningham | 310/112 |

* cited by examiner

*Primary Examiner* — Nguyen N Hanh
(74) *Attorney, Agent, or Firm* — Fish & Richardson P.C.

(57) ABSTRACT

A high power rotary device includes a stator comprising a plurality of wire coils each surrounding a non-magnetizable core; a rotor with permanent magnets embedded therein, the rotor being disposed adjacent to the stator, the rotor being mounted on a rotatable drive shaft; a position sensor operably connected to the rotor; and a control circuit operably connected to the position sensor and the wire coils to activate the wire coils. In this motor the control circuit transfers electrical charge from a first coil to a second coil.

16 Claims, 18 Drawing Sheets

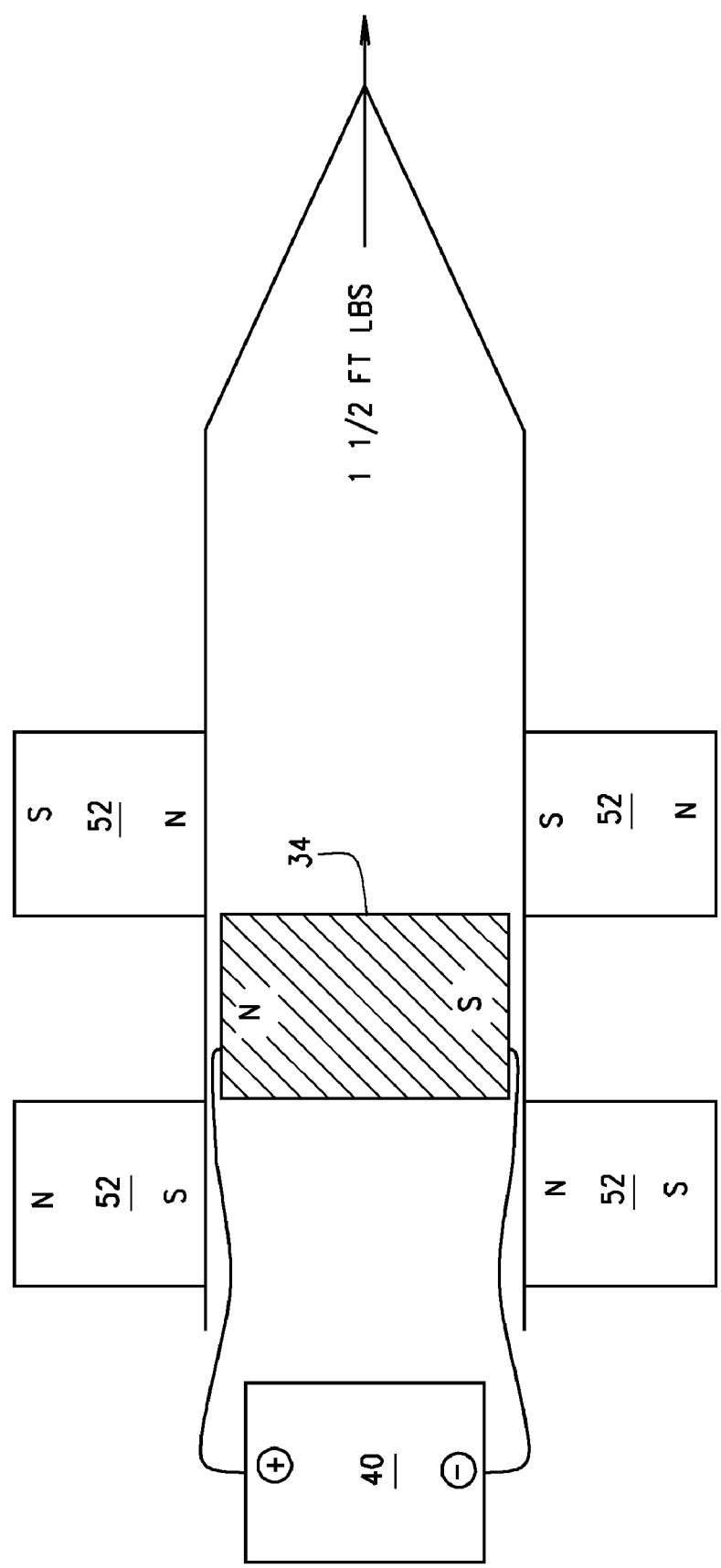

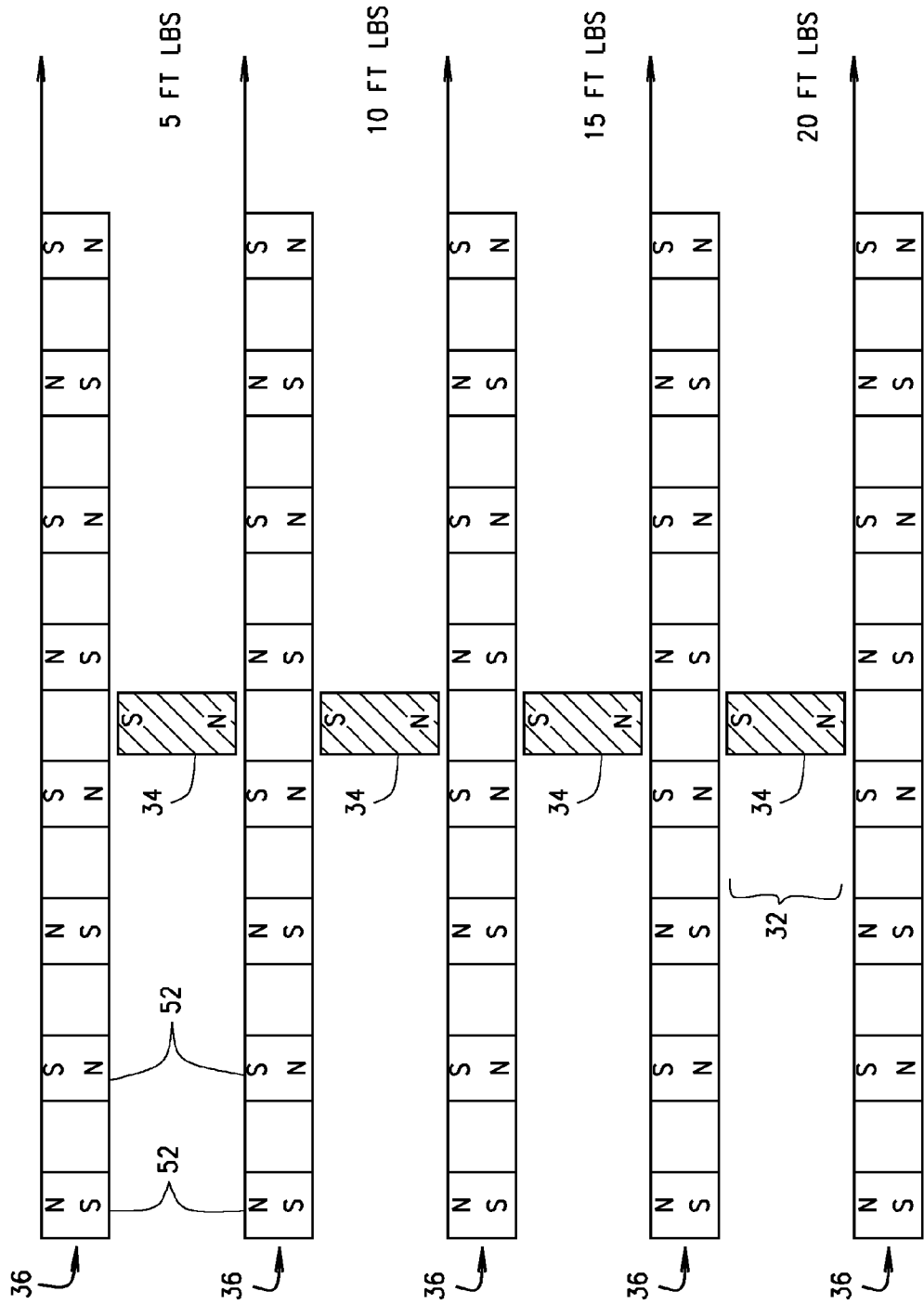

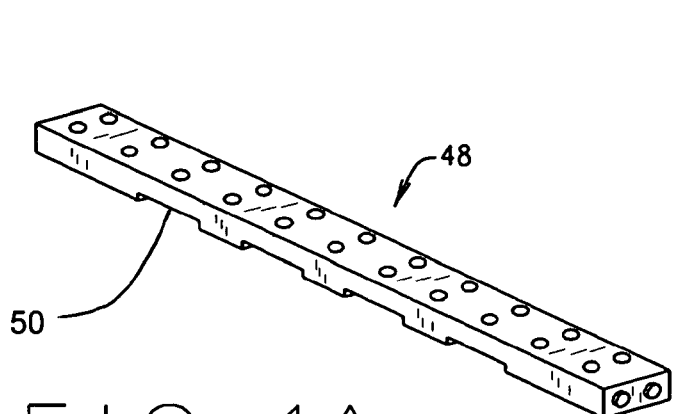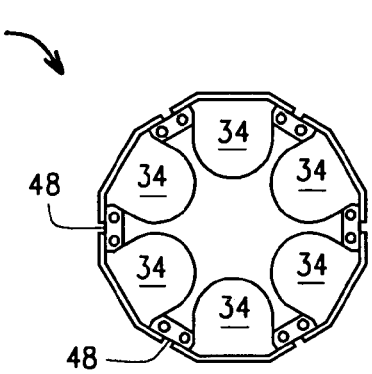
FIG. 4A
FIG. 4B
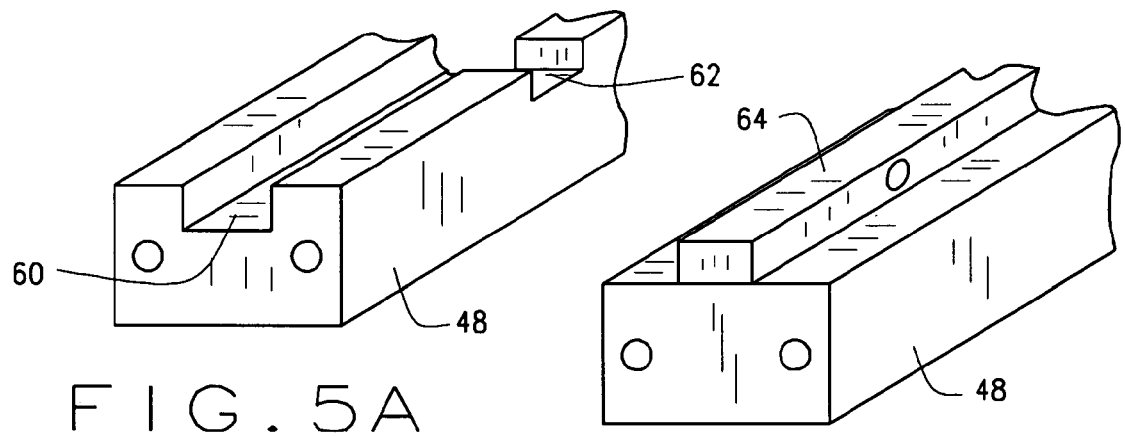
FIG. 5A
FIG. 5B
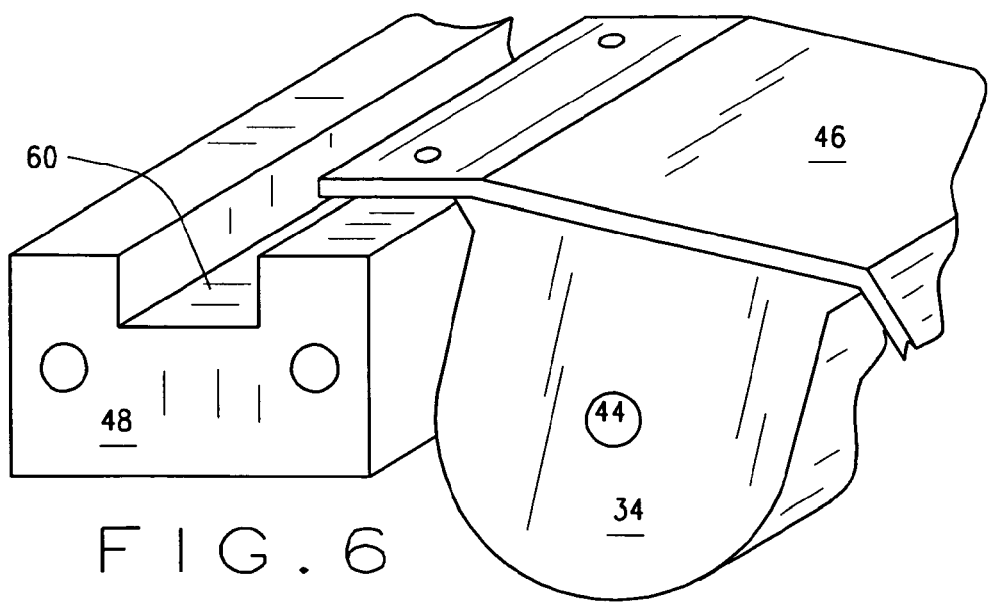
FIG. 6

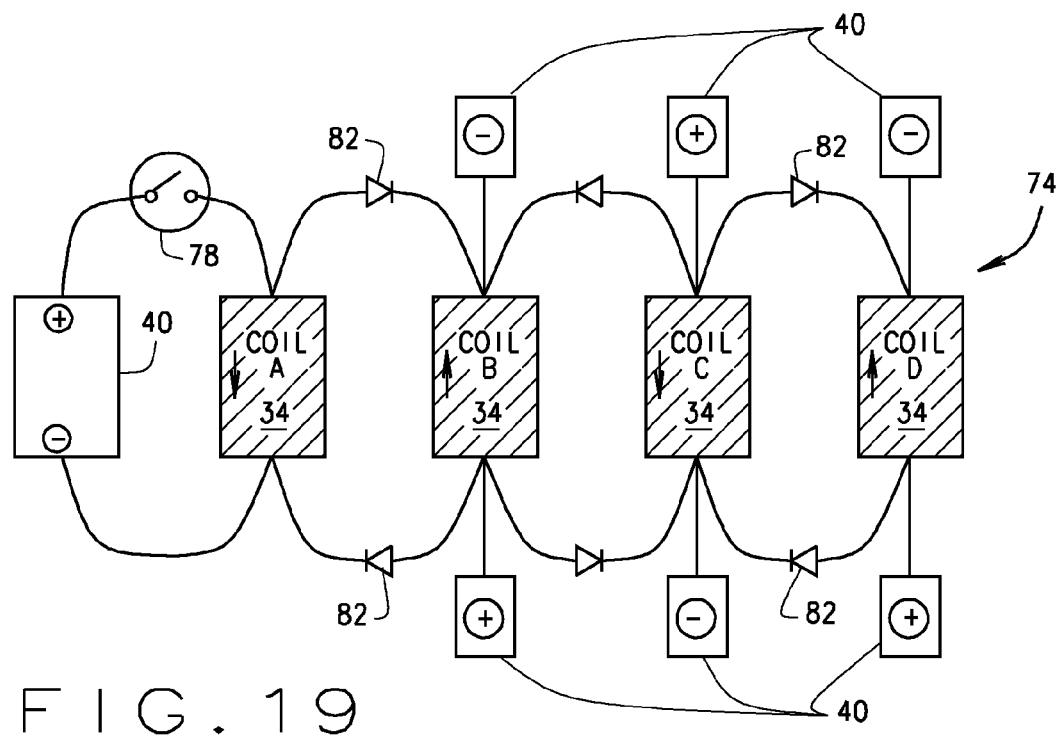
F I G . 19
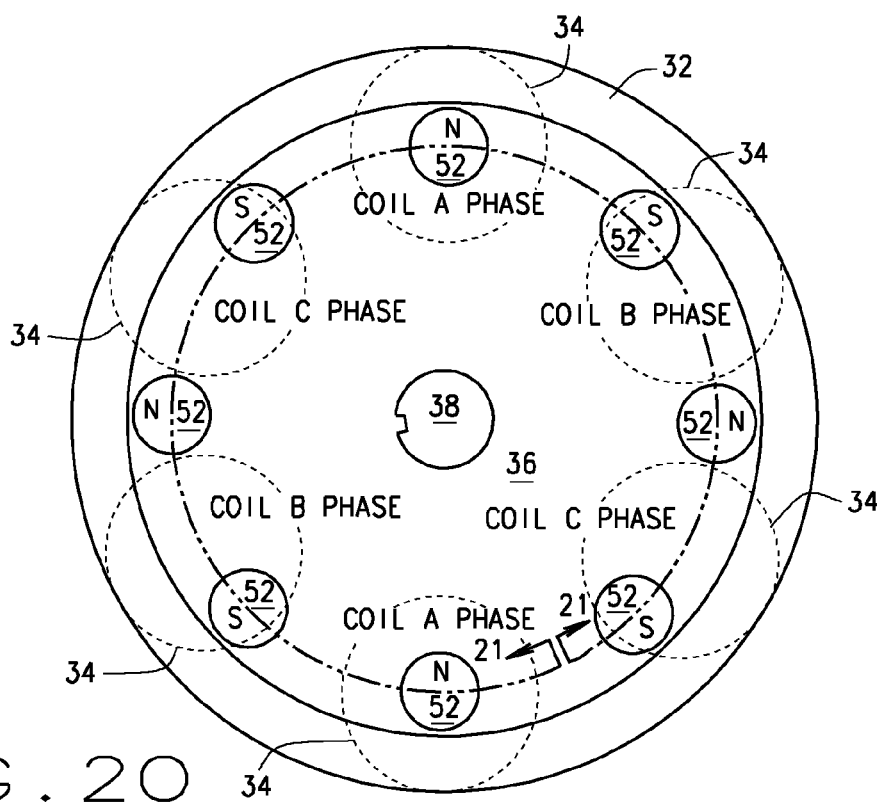
F I G . 20

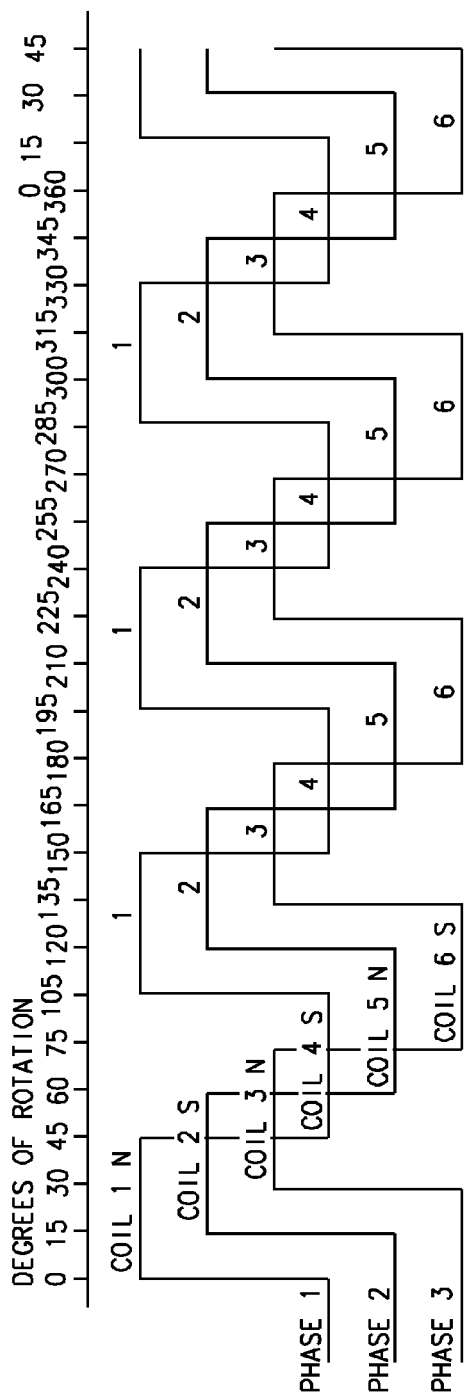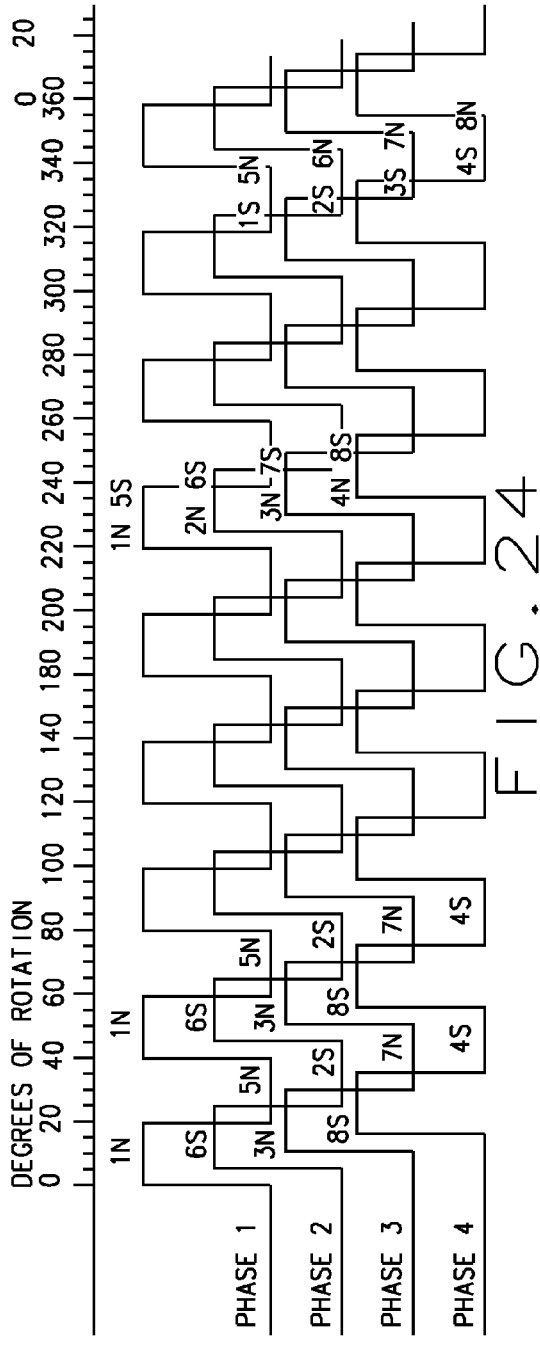

HIGH POWER ROTARY DEVICE

CROSS-REFERENCE TO RELATED APPLICATIONS

This application is a continuation of, and claims priority under 35 U.S.C. §120 to, U.S. patent application Ser. No. 12/752,548, filed on Apr. 1, 2010, which claimed priority to U.S. patent application Ser. No. 11/460,149, filed on Jul. 26, 2006. The contents of both of these priority applications are hereby incorporated by reference in their entirety.

BACKGROUND

As energy costs continue to rise and supplies dwindle there is a substantial need for more efficient use of energy, particularly for electric motors. Electric motors power many devices and thus improvements in power output from motors for a given input energy would mean significant savings in energy costs.

One usage in particular that would benefit from an improved electric motor is that of electric vehicles. Although electric vehicles have been around for over one hundred years, they have only recently begun to become widely used. Improvements in electric motor power output would help electric cars become even more practical and accepted in the marketplace.

One problem that existing electric vehicles face is their higher purchase price compared to conventional gas- or diesel-powered vehicles. This is due in part to the expensive electric motors that such vehicles use. The design of such motors is simple but their construction is very complex. In addition the control systems for such motors are complex, because of the requirements for high voltage and current and in particular the high in-rush currents involved. Finally, present electric vehicle motors require a complex transmission system.

Motors having electromagnetic coils without metal cores have been used before, for example in 'pancake' type motors generally used in low power applications. However, non-magnetizable core materials such as plastics have not been used for high power motors.

What is needed in the art are new ideas for building and controlling electric motors to produce a more energy-efficient electric motor.

SUMMARY

In one embodiment, a high power rotary device includes a stator comprising a plurality of wire coils each surrounding a non-magnetizable core; a rotor with permanent magnets embedded therein, the rotor being disposed adjacent to the stator, the rotor being mounted on a rotatable drive shaft; a position sensor operably connected to the rotor; and a control circuit operably connected to the position sensor and the wire coils to activate the wire coils; wherein the control circuit transfers electrical charge from a first coil to a second coil.

In another embodiment, a method of operating an electric motor includes providing an electric motor; electrically energizing a first coil with the power source; electrically connecting the first coil to a second coil, thereby transferring electrical energy from the first coil to the second coil under direction of the controller; and disconnecting the first coil from the power source; wherein the electric motor includes a stator comprising a plurality of wire coils each surrounding a non-magnetizable core; a rotor rotatably mounted adjacent the stator; a plurality of permanent magnets mounted to the rotor; a power source; a position sensor operably connected to the rotor; and a control circuit operably connected to the power source, the position sensor, and the wire coils, for controlling distribution of electrical energy to the wire coils.

In yet another embodiment, a multi-phase electric motor includes: a stator comprising a plurality of wire coils each surrounding a non-magnetizable core, wherein the non-magnetizable core comprises a plastic tube; a rotor with permanent magnets embedded therein, the rotor being disposed adjacent to the stator, the rotor being mounted on a rotatable drive shaft; a power source; a position sensor operably connected to the rotor through the drive shaft; and a control circuit operably connected to the power source, the position sensor, and the wire coils, for controlling distribution of electrical energy to the wire coils; wherein the control mechanism transfers electrical charge from a first, discharging coil to a second, charging coil; wherein the rotor comprises a disk having a pair of opposite faces with a circumferential edge therebetween; wherein the rotor further comprises a steel ring attached to a face near the circumferential edge; wherein the permanent magnets comprise a piece of steel sandwiched between two rare earth magnet pieces, such that at least one rare earth magnet is adjacent to the stator.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 3A-3D show how combinations of permanent magnets and electromagnetic coils produce varying levels of force;

FIG. 4A shows one embodiment of a longitudinal strip of the type that is used to support the stator coils;

FIG. 4B shows a cross-section through a stator wherein the coils of the stator are mounted on a plurality of longitudinal strips such as that shown in FIG. 4A;

FIG. 5A shows one embodiment of a longitudinal strip having slots formed on the side for running wires leading from the coils;

FIG. 5B shows another embodiment of a longitudinal strip having a wire channel for running wires mounted thereon;

FIG. 6 shows one embodiment of how the mounting bracket that holds the coil is attached to a longitudinal strip;

FIG. 19 shows still another embodiment of a circuit for shunting collapsing field current from a discharging coil to a charged or charging coil in an electric motor;

FIG. 20 shows a side view of one embodiment of a rotor wherein the relative positions of the electromagnetic coils are shown in broken lines;

FIG. 23 shows a timing diagram for one embodiment of a 3-phase motor;

FIG. 24 shows a timing diagram for one embodiment of a 4-phase, 18 permanent magnet motor.

DETAILED DESCRIPTION

The following description of the preferred embodiment(s) is merely exemplary in nature and is in no way intended to limit the invention, its application, or uses.

The motor described herein, which is referred to as a 'magnetronic' motor, differs from conventional electric motors in several respects, with the result that typical formulas describing motor behavior do not always apply to the magnetronic motor. This is due to several factors:

1. A conventional motor output requires steel to concentrate the magnetic flux; and 2. A conventional motor converts electric force into magnetic flux in the metal components, thereby completing the magnetic circuit through the stator and rotor which generates the torque applied to the rotor.

Because of these factors the maximum power output of a typical motor is limited by the amount of steel in the field and rotor as well as the amount of copper in the windings.

The motor described herein differs in these components:

1. The magnetronic motor requires no steel to concentrate the flux and in fact in most embodiments steel is detrimental to the motor's operation.

Figure 3A:
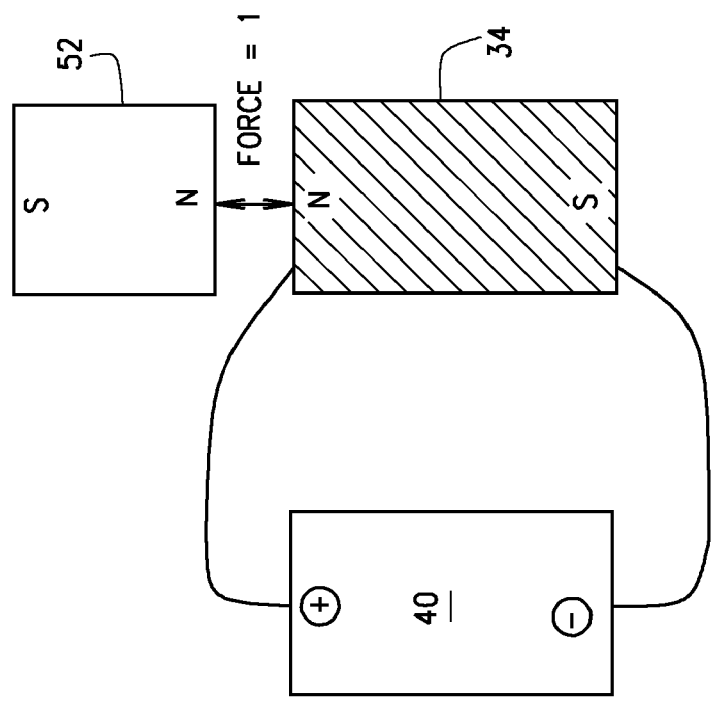
Figure 3B:
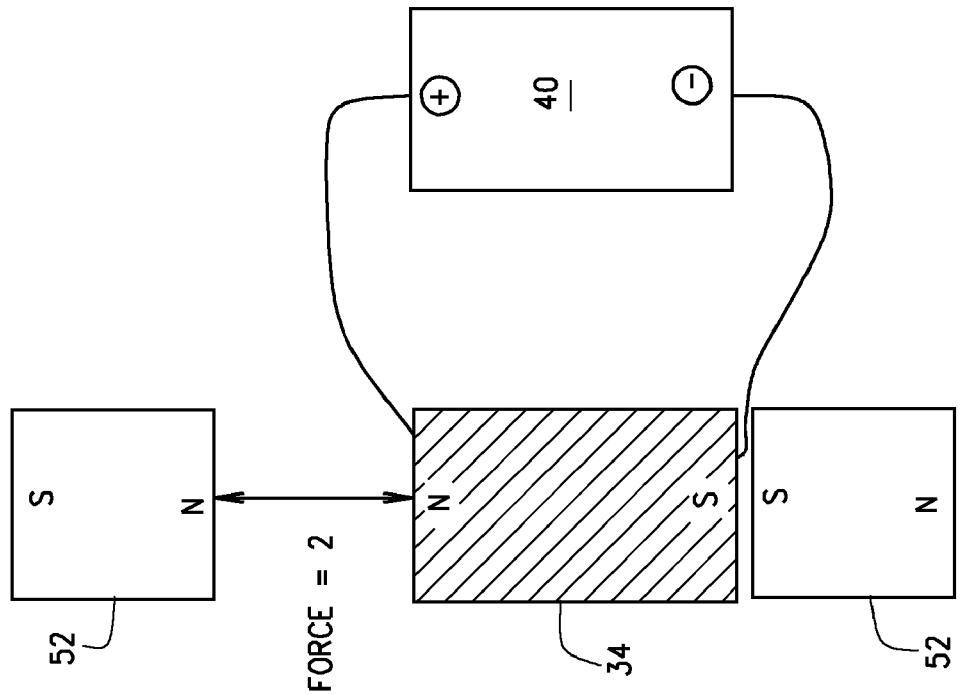

2. In the magnetronic motor the magnetic circuit is completed by the configuration of the permanent magnets in the rotor and the steel end plates on the two outside or end rotors. The flux concentration is accomplished by the configuration which causes an increase in power when the coils are energized (FIGS. 3A-3D, 14A, 14B). FIGS. 3A-3C show how combinations of permanent magnets mounted on a rotor or rotors and charged electromagnetic wire coils in a stator produce varying levels of force, with the conclusion that having more permanent magnets associated with a given coil produces an increasing amount of force.

In addition, even greater force can be produced by combining more coils with the permanent magnets 52, as shown in FIG. 3D. For example, having one coil 34 and five rotors 36, wherein each rotor 36 contains eight permanent magnets 52 for a total of forty permanent magnets 52, gives five foot-pounds of force. Adding a second coil 34 to the same five-rotor motor doubles the force to ten foot-pounds. Addition of a third coil 34 increases the force to fifteen foot-pounds and a fourth coil 34 gives twenty foot-pounds of force. Coils 34 may be added in any position around the circumference of the motor 30 and each will add five foot-pounds of force.

Another difference is the flux line orientation. In typical motors all flux lines are perpendicular to the windings which causes drag on the rotor as it turns (due to generated back EMF). In a typical motor this back EMF is necessary or the current will be so high the windings will burn up.

In the magnetronic motor a portion of the flux is parallel to the winding reducing the drag or generated back EMF. This flux orientation can be altered by the spacing of the PM in the rotor in relation to the space between rotors. In addition there is no inrush or high current caused by lack of back EMF. Thus, the design of the magnetronic motor automatically controls current.

The magnetronic motor has several significant differences in its construction that give rise to the differences in function.

In typical motors the windings are placed in a steel slot in such a way that the windings overlap one another. Because of this, if one winding gets hot it heats the overlapping windings and the entire motor overheats and burns up. Even if only one winding burns up, all of the windings must be removed to replace any winding.

In the magnetronic motor the windings are simple bobbin coils, each independent of the others, and can be removed or placed into the motor one at a time. By this design the motor is completely modular. Rotor modules can be added thereby lengthening the motor, which adds slots for coil modules thus increasing motor output. This modular concept makes engineering a new motor much simpler.

The last thing does not apply to typical motors but applies to attempts at making these motors more efficient by using the back EMF to regenerate or supplement input power.

The magnetronic motor uses a new approach that works very well in its operation and is accomplished by two separate methods.

1. Reduction of rotor drag or back EMF by altering the flux orientation as mentioned elsewhere in this application.

2. Utilizing the collapsing field energy when a coil is de-energized to supplement the input power to a different coil, preferably one that is just turning on.

Figure 1:
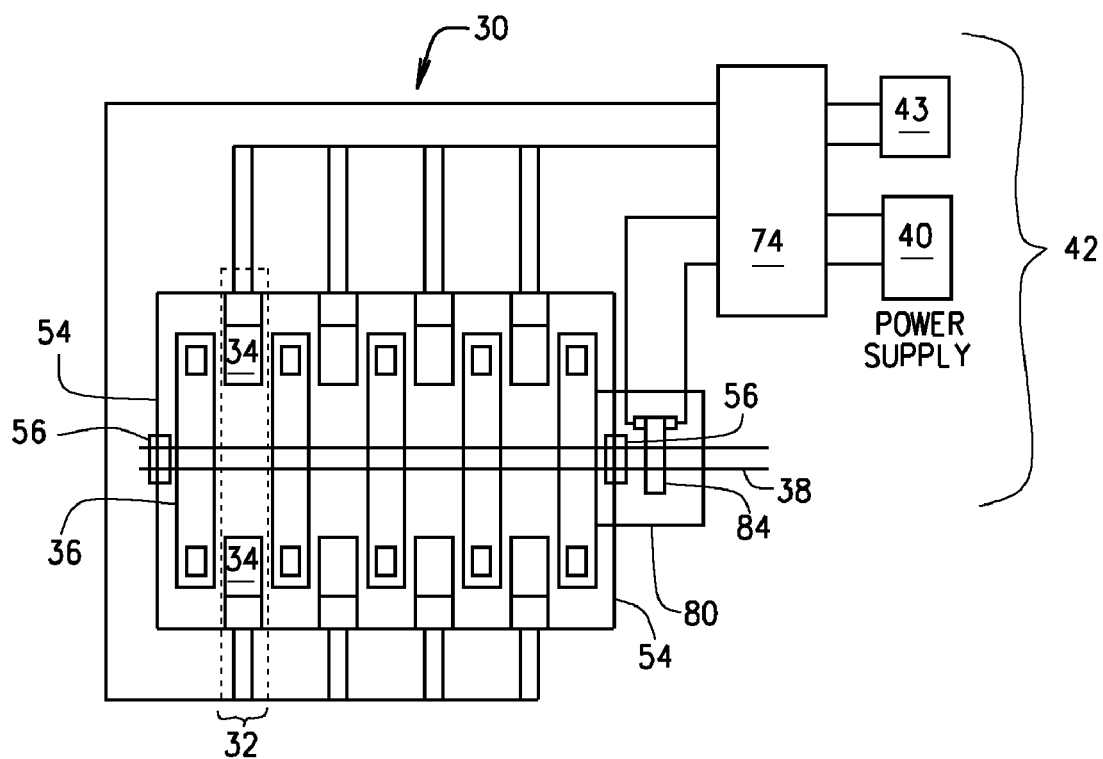
FIG. 1 shows a schematic view of one embodiment of the motor.
Figure 2:
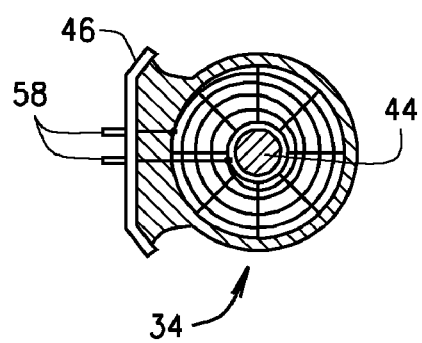
FIG. 2 shows one embodiment of a single coil.

Therefore, a multi-phase electric motor 30 comprises a stator 32 comprising a plurality of coils 34, a rotor 36 mounted on a drive shaft 38, a power source 40 for charging the coils 34, and a control mechanism 42 for controlling the charging of the coils 34 by the power source 40 (FIGS. 1, 2).

In one embodiment the stator 32 comprises a plurality of wire coils 34, wherein the wire coils 34 are wound around a non-magnetizable core 44. The non-magnetizable core 44 may be made of any of a variety of materials, including without limitation plastic, whether a solid rod or hollow tube. The coil core 44 is preferably circular in cross-section so that the wire coil 34 itself is also circular. Nonetheless, other shapes for the core 44 and wire coils 34 are possible. In one embodiment the coiled wire is held in place by a series of radial ties running through the center of the core 44 and around the outside. In addition, in one embodiment the coil 34 is molded with a resin such as fiberglass. The mold imparts a shape on the resin that complements that of a mounting bracket 46 (see below) to which the coil 34 is attached. The coil 34 with associated resin is then attached to the mounting bracket 46 using adhesive or other attachment means.

In a typical configuration, the coil core 44 has a cross-sectional diameter of one inch. In addition, the coil wire in one embodiment is 11 gauge copper wire and is wound about the core 44 approximately 300 times. The outer diameter of the wire coil 34 in this embodiment is 3 inches. Nonetheless, other configurations are possible and are encompassed within the invention.

The wire windings of the coils 34 have a uniform orientation wherein the windings are in a plane that is parallel to the plane of rotation of the rotor 36 when the coils 34 are installed in the stator 32. When the coils 34 are disposed within the stator 32 and are electrically energized, the magnetic field that is created extends laterally from the stator 32 towards the adjacent rotors 36. The orientation is such that one side of the coil 34 is magnetic north (N) and the other side is magnetic south (S); this orientation can be changed by reversing the polarity of the input electricity. Each coil 34 is electrically energized by connecting the ends of the wire coil 34 to an appropriate power source 40, as explained further below.

The wire coils 34 are held in place within the stator 32 by a frame structure 47, which in one embodiment is made of aluminum. The frame comprises a plurality of longitudinal strips 48 of material that run parallel to the long axis of the drive shaft 38, i.e. parallel to the axis of rotation. In one embodiment the longitudinal strips 48 of material have a series of notches 50 formed therein for locating the coils 34 at the correct positions in the correct orientation.

The coils 34 are held onto a mounting bracket 46, which bracket 46 is then attached to the longitudinal strips 48 of the frame structure 47 (FIGS. 4A, 4B). In one embodiment the brackets 46 are bent slightly at the edges in order to mate properly with the longitudinal strips 48. The brackets 46 are preferably attached to the longitudinal strips 48 using reversible fasteners, which makes it easier to repair or replace defective or damaged coils 34. In one embodiment the longitudinal strips 48 have a series of threaded holes tapped therein for receiving screws or bolts for attachment of the coil mounting brackets 46. The coils 34 are spaced apart along the longitudinal strips 48 so as to leave room therebetween for the rotors 36. Each coil 34 has adjacent thereto in close proximity a rotor 36 in which a number of permanent magnets 52 are embedded. Apart from the frame structure 47 for holding the coils 34 in place, which structure 47 resides at the periphery of the motor, the stator 32 in one embodiment is otherwise empty space, in contrast to many other electric motors. This construction permits much easier manufacture and assembly.

The ends of the longitudinal strips 48 of the support structure 47 are attached at either end of the motor 30 to end plates 54. These end plates 54 also support the drive shaft 38 which in turn supports the rotors 36, thereby giving the motor 30 its overall structure. In one embodiment the drive shaft 38 projects through and beyond one or both end plates 54 and is subsequently coupled to a device to be driven.

In one particular embodiment the end plate 54 is 0.625 inches thick and 11.75 inches in diameter. In addition the end plate 54 may have mounted thereon a bearing retaining plate 56 (FIG. 1) for holding bearings for the drive shaft 38, which bearing retaining plate 56 comprises a ring with a two and a half inch inner diameter and a four inch outer diameter.

In one embodiment the wire leads 58 from each coil 34 are fed through the mounting bracket 46 (FIG. 2). In another embodiment the longitudinal strips 48 have a channel 60 formed therein for the wires to run through (FIGS. 5A, 5B, 6). In this case the wires leave the coils 34 on the side and through a slot 62 formed on the long edge of the strip (FIG. 5A). In one embodiment the coil mounting bracket 46 side portions are made to be wide enough to cover the slots 62 that are adjacent to the main channel 60 (FIG. 6). In still another embodiment a raised wire channel 64 is formed on or attached to one side of the longitudinal strips 48, wherein there are holes in the sides of the channel 64 aligned with each coil 34 for the wires to run through (FIG. 5B). In either of these latter embodiments the wires are run through the longitudinal strip 48 to one or both ends of the motor where they connect with the power source 40 and control mechanism 42.

Figure 7A:
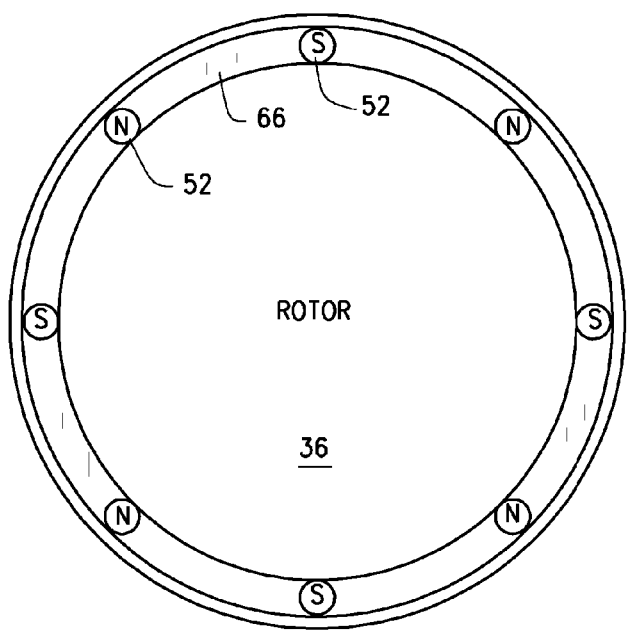
FIGS. 7A and 7B show one embodiment of a rotor in which an optional steel shunt ring is employed.
Figure 7B:
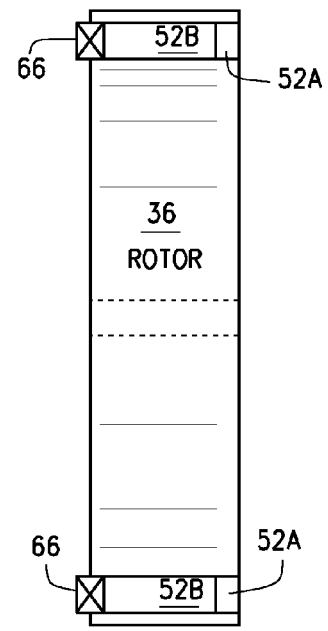

Collectively, a series of wire coils 34 mounted in a circle is referred to herein as a stator 32. In one embodiment the electric motor 30 has four stators 32 and five rotors 36, such that each stator 32 has a rotor 36 on either side thereof, but the rotors 36 at either end of the motor only have a stator 32 on one side but not on the other. In addition, in some embodiments the rotors 36 at either end of the motor 30 have an iron-containing metal (e.g. steel) shunt ring 66 running along the outside perimeter of the rotor 36 on top of the permanent magnets 52 (FIGS. 7A, 7B). In those cases where the permanent magnets 52 are layered composites of slices of magnet and other materials, the magnets are not included on the side of the rotor 36 which has the ring 66 attached. The ring 66 improves magnet flux in the motor 30, creating a horseshoe effect, and also eliminates drag that would occur if any conducting material is at the end of the motor. In those embodiments where the steel ring 66 is omitted, it is preferable to make the end plates 54 out of a material that is not electrically conductive, for example phenolic resin or some other type of resin.

The wire gauge, length of the coil winding, the number of turns, and the type of core material employed each change the characteristics of the motor 30. In addition, the shape of the core 44 material as well as the shape of the permanent magnets 52 can also change the way the motor 30 detents. Listed below are several possible types of core 44 structures and some of the effects the core 44 structure has on properties of the coil 34 (FIGS. 8A, 8B, 8C).

Figure 8A:
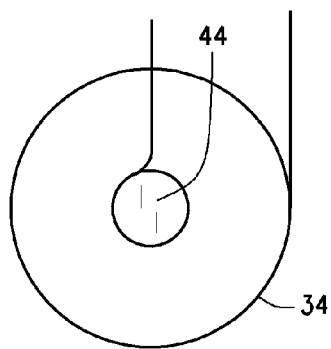
FIGS. 8A, 8B, and 8C show several embodiments of wire coils wound around different types of cores.

In one structure a wire wound coil 34 has a solid laminated core 44 (FIG. 8A). This configuration has high inductance and significant hysteresis loss, and flux is concentrated in the core.

Figure 8B:
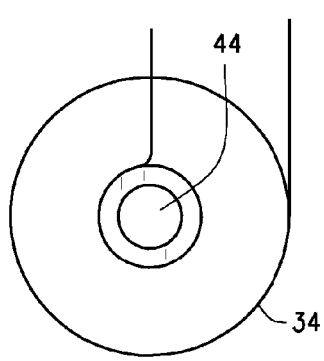

In another configuration there is provided a wire wound coil 34 with a hollow core 44 (FIG. 8B). This configuration has moderate inductance, moderate hysteresis loss, and flux is concentrated in the core 44. One example of this configuration is wire wound around a coil with a hollow iron core.

Figure 8C:
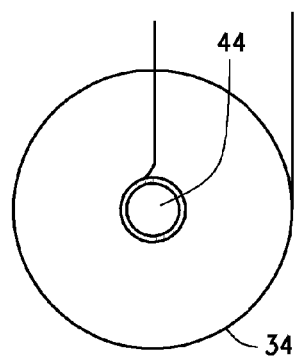

In yet another configuration there is provided a wire wound coil 34 with an air core 44 (FIG. 8C). This configuration has low inductance, no hysteresis loss, and flux is distributed more evenly across the entire pole face.

Also, wires are used as the laminations rather than flat laminations as is typical. Furthermore, the wires can be in any shape, including round, pie, or hollow laminated pipe. For high rotational speeds (in RPM), high efficiency air cores should be best, while a laminated core may be better for higher torque where high RPM's and efficiency are not a concern.

The rotor 36 in one embodiment is made from phenolic resin, although other types of resins would work as well. In another embodiment the rotor 36 is made from aluminum. In either case the rotor 36 in one embodiment is fixedly attached to a drive shaft 38 in order to transfer the power of the motor 30 to a driven component. The rotor 36 is essentially a flat circular disk in which a series of holes are made for accommodating the permanent, or fixed, magnets 52.

Figure 9A:
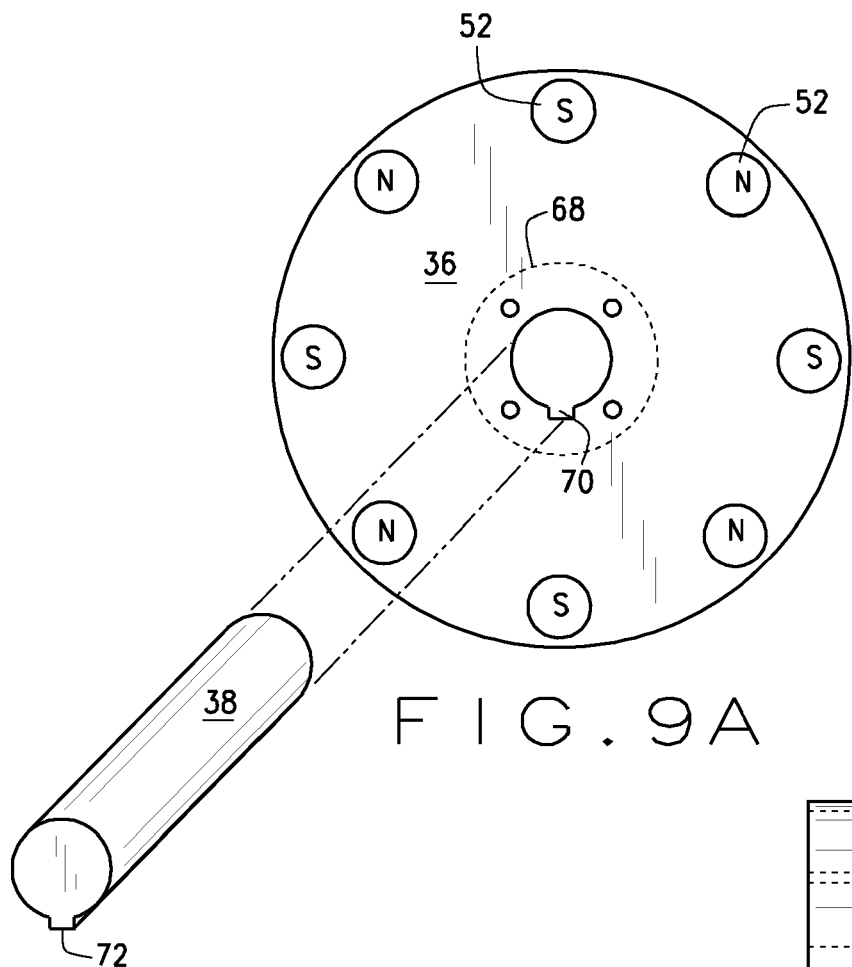
FIGS. 9A and 9B show a front view and side view, respectively, of one embodiment of a modular rotor component.
Figure 9B:
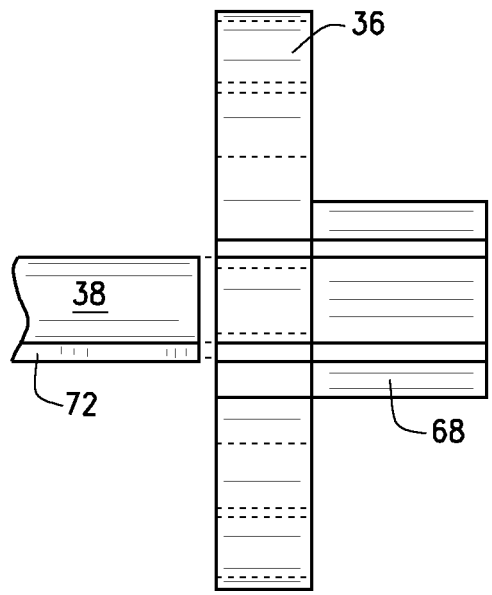

The motor 30 can be made in a modular fashion, such that any variable number of rotors 36 and stators 32 (generally there is one more rotor than the number of stators) can be assembled into a single motor 30, so that a motor 30 of any size and power can be made from a limited number of basic components. In order to make the motor 30 modular while still maintaining the correct rotor-to-rotor spacing, the rotor 36 in one embodiment has a hollow spacer 68 projecting from one side near the center (FIG. 9B). In one embodiment the spacer 68 is steel. Both the rotor 36, which in one embodiment is aluminum, and the attached spacer 68 have a hole in the center to accommodate the drive shaft 38 and also have a slot 70 inside the hole to accommodate a ridge 72 projecting from the drive shaft 38, where the ridge 72 and slot 70 are complementary to one another. The ridge 72 and slot 70 combination helps to transmit power from the rotors 36 to the drive shaft 38 without any slippage relative to the drive shaft 38. Alternatively, the ridge 72 may be on the inside of the opening of the rotor 36 whereupon the slot 70 is made in the drive shaft 38 (FIG. 20).

In one particular embodiment the rotor 36 is 1.5 inches thick and 9 inches in diameter. The steel spacer 68 is 3 inches in diameter and projects out from the face of the rotor 36 by 2.7 inches. The diameter of the drive shaft 38 is approximately 1.5 inches, as is the hole inside the rotor 36 and spacer 68 for accommodating the shaft. The spacer 8 in one embodiment is attached to the rotor 36 using four 0.25 inch bolts, although other means of joining the two parts are encompassed within the invention (FIG. 9A).

Figure 9C:
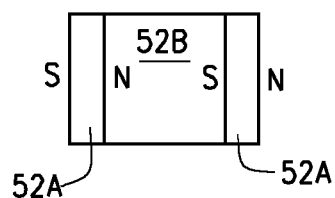
FIG. 9C shows one embodiment of a composite magnet for use in a rotor.

In one embodiment the permanent magnets 52 comprise a composite of two rare earth permanent magnets 52A with a steel rod 52B in between. The composite structure in one embodiment is cylindrical overall and has a diameter of 1 inch and a length of 1.5 inches (FIG. 9C). The permanent magnets 52A in this embodiment are each 0.25 inches thick and the steel rod 52B is 1 inch thick. In one embodiment the magnets 52A and steel rod 52B are attached to one another and to the rotor 36 using adhesives.

There are eight composite permanent magnets 52 in this embodiment, wherein the permanent magnets 52 are spaced equally about the rotor 36 near the edge. Eight one-inch diameter holes are formed in the rotor 36 about 0.125 inches from the edge of the rotor 36. In this embodiment and in general, the permanent magnets 52 are arranged such that the polarity alternates between having magnetic north and magnetic south pointing to one side of the rotor or the other. To achieve this alternating configuration continuously around the rotor 36 it is preferred that there is always an even number of permanent magnets 52 or composites thereof.

The distance between adjacent permanent magnets 52 on the rotor 36 in one embodiment is approximately equal to the distance between adjacent rotors 36 (FIG. 10), although the distance between adjacent permanent magnets 52 may sometimes be larger than the rotor-to-rotor spacing. In one embodiment these distances are both approximately 2.5 inches. In general, back EMF is reduced as the distance between adjacent permanent magnets 52 on a given rotor 36 is reduced. Also as a general matter, back EMF, rpm's, and torque change as a function of rotor-to-rotor spacing and of the space between permanent magnets 52 within the rotors 36.

Figure 11:
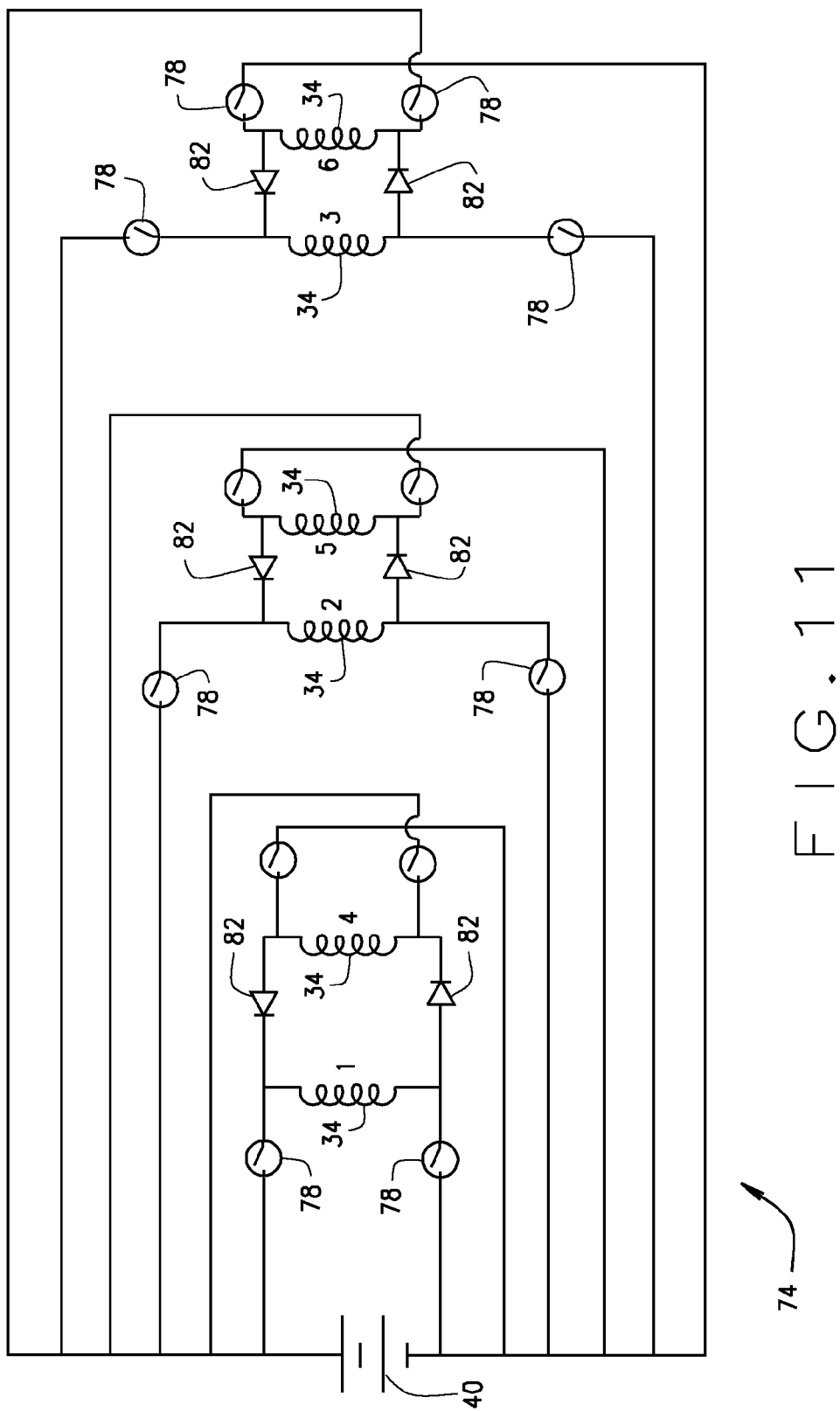
FIG. 11 shows one embodiment of a circuit for energizing the coils of a motor.

The control mechanism 42 in one embodiment comprises a circuit 74 connected to a position sensor 80, wherein the circuit 74 is connected to the coils 34 and the power source 40. In another embodiment the control mechanism 42 also comprises a microprocessor 43, described further below. One example of a circuit 74 for controlling this embodiment of the motor 30 is shown in FIG. 11. This circuit 74, which is for a six-coil, three-phase motor having eight permanent magnets 52, uses a single power source 40. The switches 78 operate as double pole, double throw switches. These switches 78 are controlled by a position sensor 80 associated with the rotor 36 or drive shaft 38 as described further below. Coils 1 & 4, 2 & 5, and 3 & 6 are situated on diametrically opposite sides of the stator 32 and are always in an opposite state from the other, i.e. when coil 1 is on, coil 4 is off and when coil 4 is on, coil 1 is off. In this particular embodiment, diodes 82 control the directional flow of current in the circuit 74 such that the collapsing field energy from a particular coil helps to charge the diametrically opposite partner coil.

Figure 12:
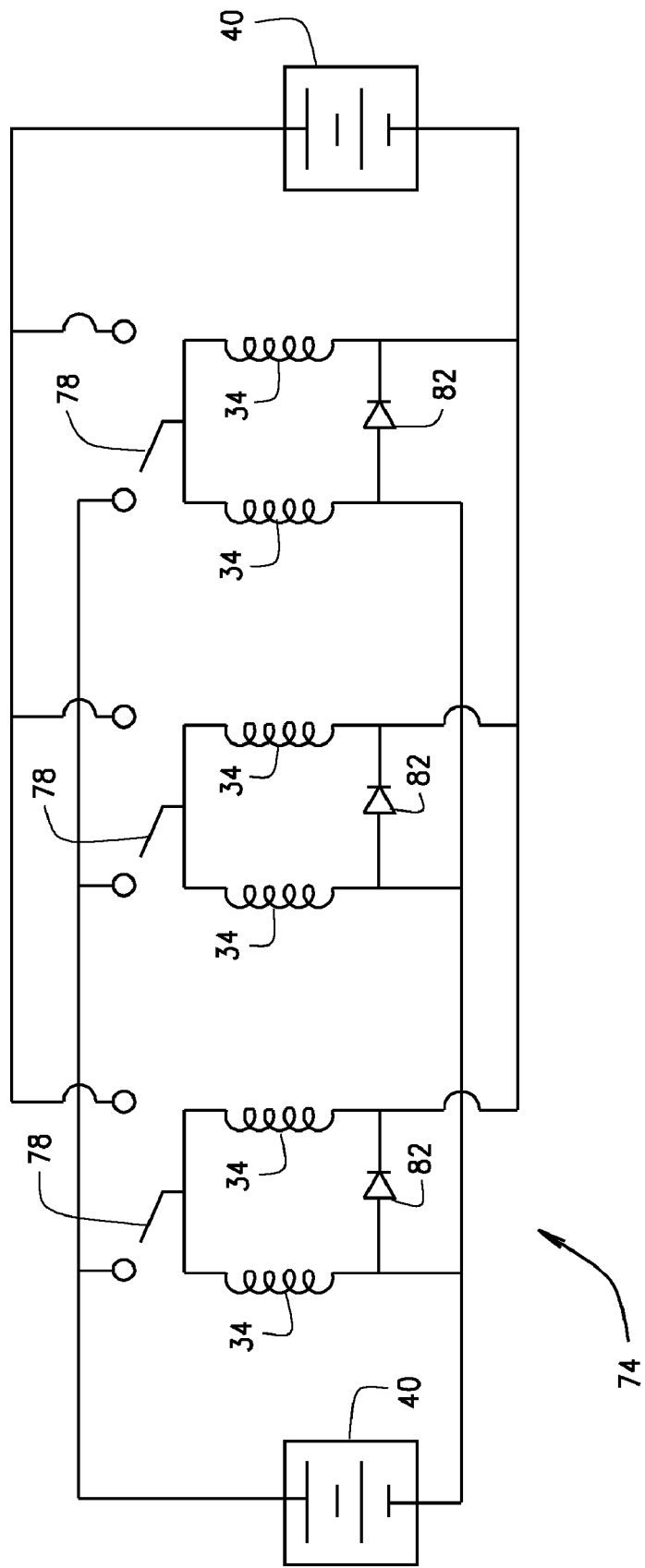
FIG. 12 shows another embodiment of a circuit for energizing the coils of a motor.

FIG. 12 shows another embodiment of a circuit 74 for controlling the motor 30, using half as many switches 78 as the previous circuit. In this alternative configuration there are two power sources 40, which simplifies construction of the system. This circuit 74 is preferred for 'push only' motors since it does not readily provide for switching the polarity of the power supplied to a particular coil 34, and hence does not provide for switching the magnetic polarity of the coils 34, during the cycle. Again, diodes 82 are placed between paired coils 34 to direct collapsing field energy between coils 34. Also, the switches 78 are controlled by the position sensor 80, described further below.

Figure 13:
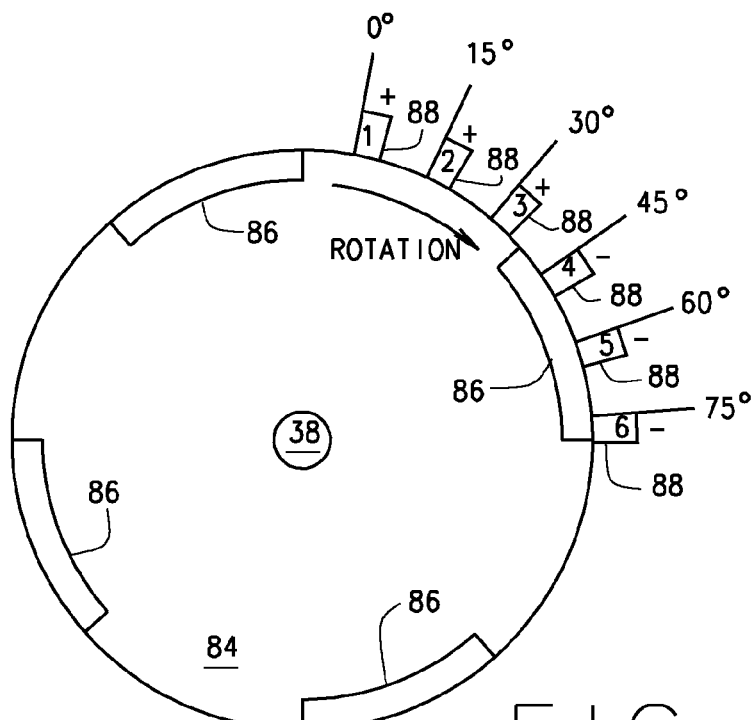
FIG. 13 shows one embodiment of a position sensor.

FIG. 13 shows the general requirements for a position sensor 80 for a six-coil, three-phase, eight permanent magnet 52 motor of the present embodiment, specifically a magnetically-controlled position sensor 80. The position sensor 80 in one embodiment comprises a control wheel 84 attached to the drive shaft 38, such that the control wheel 84 tracks movement of the drive shaft 38, which in turn tracks the position of the rotor 36. Various means may be used to track the position of the control wheel 84, including magnetic strips 86 with magnetic sensors 88 or pick-ups mounted around the periphery of the wheel 84 to detect the presence or absence of the magnetic strips 86. By having magnetic sensors 88 spaced at fifteen degree intervals adjacent the control wheel 84 and by having the magnetic strips 86 extend ⅛.sup.th of a turn of the wheel 86 as shown in FIG. 13, this has the effect of activating each of the magnetic sensors 88 in the correct order and for the proper duration to energize the coils 34, as discussed further below.

For a motor 30 having eight permanent magnets 52 the preferred on-time for a given coil 34 is approximately equal to ⅛.sup.th of a turn of the rotor 36, or 45 degrees. Thus the magnetic strips 86 on the position sensor 80 that activate the coils 34 extend for ⅛.sup.th of a turn of the control wheel 84. The control wheel 84 is fixedly attached to the rotors 36 or drive shaft 38 such that rotation of the rotors 36 and drive shaft 38 turns the control wheel 84 (see FIG. 1). To maintain the proper phases, the magnetic sensors 88 are spaced 15 degrees apart alongside the control wheel in order to turn on the coils in succession and to turn off one of a pair of coils as the other coil of the same pair is turned on. In this embodiment, coils 1-3 are energized with an opposite polarity from coils 4-6. Similarly, coils 1, 2, and 3 are energized and de-energized at opposite times from coils 4, 5, and 6, respectively.

The general principles of the embodiment depicted above, having six coils, three phases, and eight permanent magnets, can be extended to any number of phases greater than two, any even number of permanent magnets, and any number of coils. Although it is preferred to have an even number of coils to more easily coordinate transferring collapsing field energy from one coil to another, it is also possible to design a motor having an odd number of coils using the principles discussed herein.

Increasing the number of coils 34 and phases in the motor 30 also increases the complexity and cost of manufacturing the motor 30, particularly the electronics that are required to drive the coils 30. On the other hand, having a greater number of coils 34 and phases increases the efficiency of the motor 30 since it is easier to perform shunting of collapsing field energy from one coil to another at just the right point in the charging cycle for each coil. In one embodiment, a four-phase motor with eight coils and eighteen permanent magnets represents a good compromise between manufacturing costs and motor performance.

Another factor that can have a profound effect on motor performance is 'back EMF'. Back EMF occurs in electric motors due to relative motion between the magnets on the rotor and the windings on the stator. The constantly changing magnetic flux in the area between the coils of the motor induces an EMF that opposes the rotation of the rotor which is called 'back EMF'. There can also be voltages induced in any electrically conductive materials in the rotor, so it is preferred that the rotor be made of a non-conductive material. Nonetheless, in one embodiment aluminum was used to make a rotor with limited negative effects.

In conventional motors the total torque is determined by the amount of steel and the amount of copper in the motor in the rotor and stator. A balance must be made to match the copper and steel to get the best efficiency. In the motor described herein, however, there is no strict requirement for steel components in either the rotor or stator. The total torque is determined by the total flux in the permanent magnets 52 and the field produced by the current in the coils 34. The flux in the coils 34, in turn, is a function of amperes of current running through the coils 34 times the number of turns of wire around the coil 34.

The additional effect of average flux density between the permanent magnets 52 in the rotor 36 and the average flux between the rotors 36 also affects torque in the presently-described motor 30. Back EMF occurs only when magnetic flux passes through a wire which is perpendicular to the flux. In the rotors 36 of the presently-described motor 30, however, the flux between the permanent magnets 52 is parallel to the windings; therefore, no back EMF is generated by the motion of the rotor 36 along these lines of flux. The flux lines that extend between permanent magnets 52 of adjacent rotors 36 are perpendicular to the windings (FIG. 10), therefore causing back EMF when the rotor 36 turns. Since total power available is the combined flux of the permanent magnets 52 and the coil 34 flux, spacing between the coils 34 and permanent magnets 52 also comes into effect according to the Biot-Savart Law. Note that the respective sizes of both the coil 34 and the permanent magnets 52 increase the total flux available, just as the numbers of coils 34 and permanent magnets 52 increase total flux.

In a motor of a fixed diameter and fixed coil and permanent magnet size, average flux density is also fixed. However, addition of more permanent magnets in the rotor not only increases total flux in the rotor, but also increases average flux density between the permanent magnets in the rotor. Total flux from rotor to rotor also increases, but the space remains the same so the average flux density remains fairly constant. With the average flux density between the permanent magnets in the rotor stronger, back EMF decreases because the lines of flux are parallel to the windings. With this very low back EMF, instead of current being high at low rotational speeds (in RPM), current under these conditions is in fact very low due to the complex flux lines within the rotor and rotor to rotor. Current is limited in a manner analogous to how a field effect transistor controls the flow of current through it, in that current is controlled by the resistance of the coil. The motor is similar to a field-effect transistor in that the magnetic flux in the rotors is controlled by a relatively small electric current in the stator windings. The net result is that the motor that has no inrush or peak current and because it has no magnetic metal it can operate at very high rotational speed (in RPM). In addition, because of the high total flux available the motor has very high torque.

Figure 10:
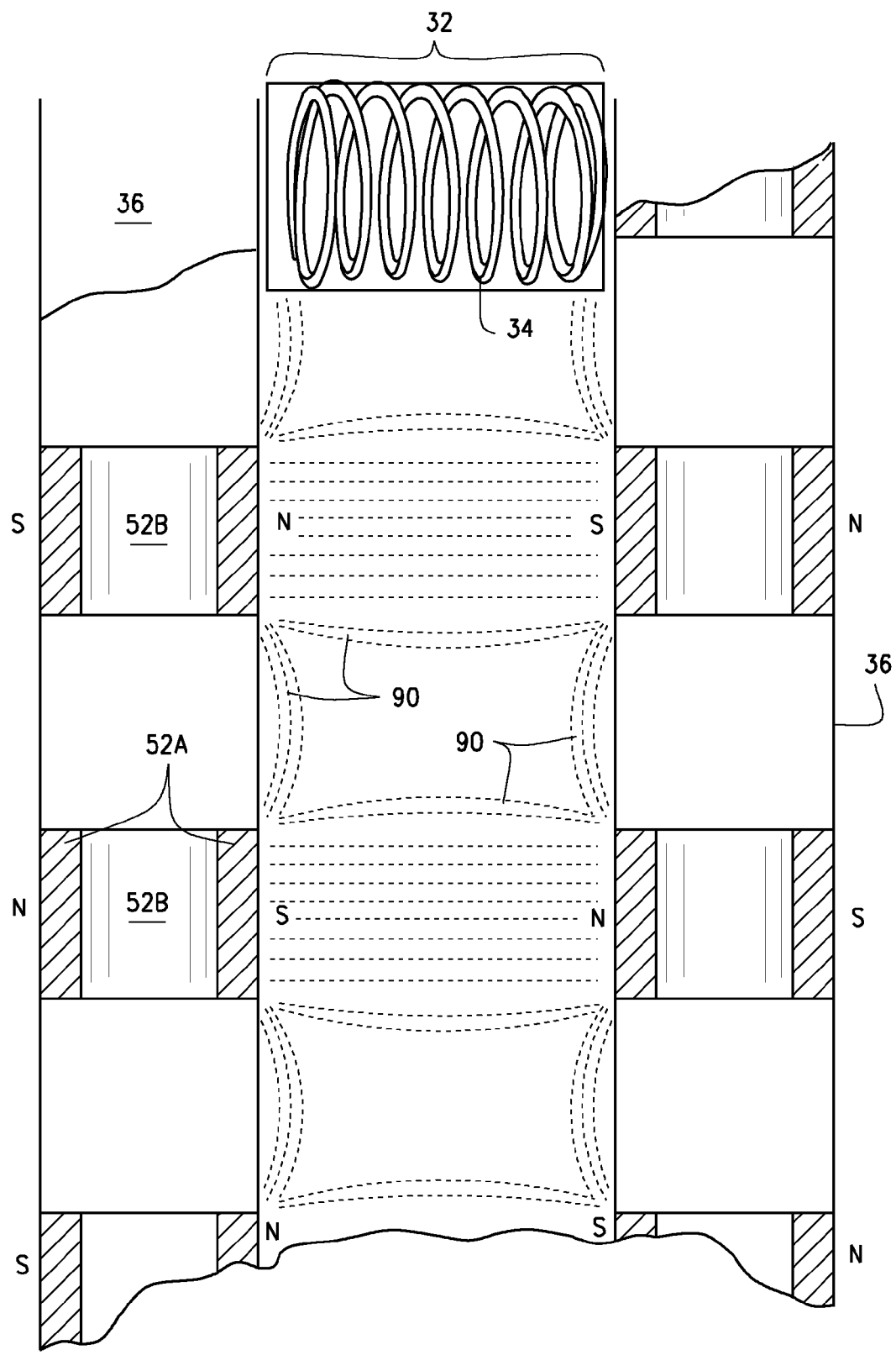
FIG. 10 shows a diagram of flux lines between the permanent magnets and electromagnetic coils in a section of one embodiment of a motor.
Figure 14A:
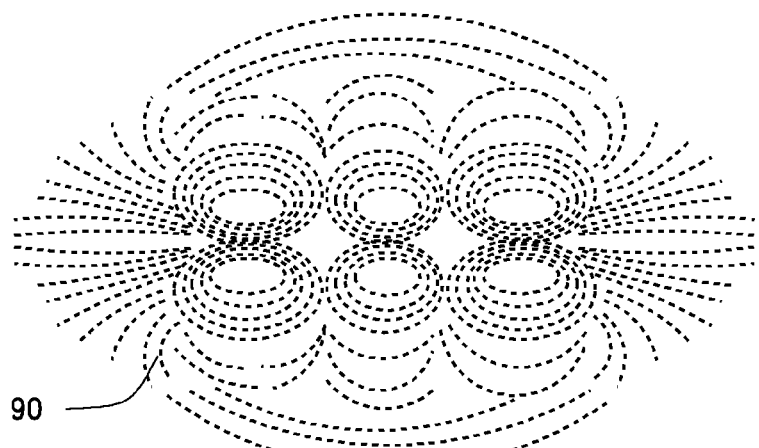
FIGS. 14A and 14B show magnetic field lines for one embodiment of a motor determined by direct assessment using iron filings.
Figure 14B:

The lines of flux 90 for a typical motor 30 as described herein are shown schematically in FIG. 10. Furthermore FIGS. 14A and 14B show the results of a direct assessment of the magnetic flux lines 90 in a motor 30 as herein described, determined according to the distribution of metal filings relative to the motor components. As can be seen, the primary flux lines 90 are in the spaces between the permanent magnets 52 of the rotors 36, both between permanent magnets 52 of separate rotors 36 and between the permanent magnets 52 of the same rotor 36.

In one embodiment the permanent magnets 52 are rare earth magnets. As described above, in another embodiment the permanent magnets 52 are a composite structure comprising two slices of permanent magnet 52A, preferably rare earth magnet, with another material 52B sandwiched in between. In a preferred embodiment the two slices of magnet 52A are approximately the same thickness. The slices of magnet 52A are oriented so that the south magnetic pole faces out on one side of the sandwich and the north magnetic pole faces out on the other side of the sandwich. In one embodiment the intermediate material 52B between the permanent magnets 52A is non-magnetized material such as iron or steel, and in general the material 52B preferably has a high permeability capable of the flux density in the permanent magnets 52A. In a preferred embodiment the permanent magnets 52, whether a single piece or a composite, are circular in cross-section and cylindrical overall, although other cross-sectional shapes are possible.

The permanent, or sometimes called fixed, magnets 52 of an electric motor interact with the electromagnets, which themselves have alternating polarity in order to alternately push and pull the rotor 36 towards or away from the permanent magnets 52 as the rotor 36 turns. It is desirable to have a high magnetic flux density in the permanent magnets 52, for example 12,000 Gauss.

Figure 15A:
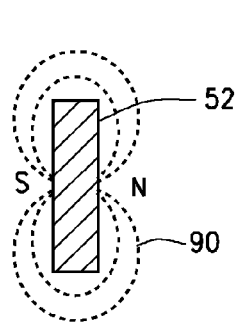
FIGS. 15A, 15B, and 15C show magnetic field lines for increasingly large permanent magnets.
Figure 15B:
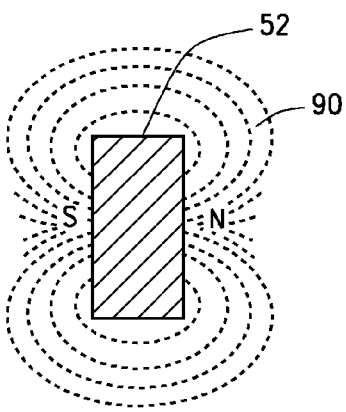
Figure 15C:
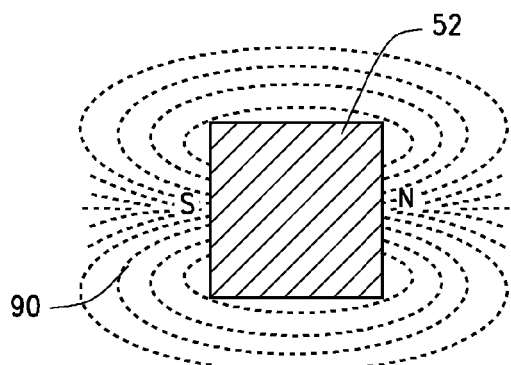
Figure 15D:
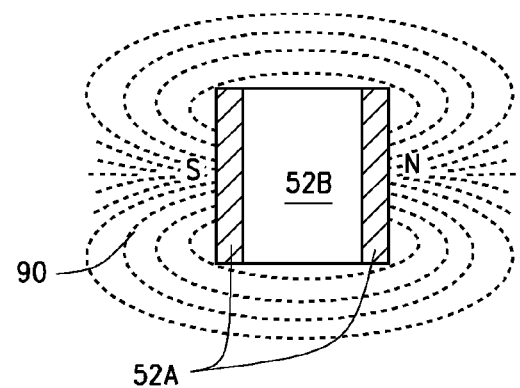
FIG. 15D shows magnetic field lines for a composite magnet comprising a steel slug sandwiched between two slices of permanent magnet.

As stated previously, rare earth magnets work especially well for this purpose. As the distance between the north and south magnet poles is increased, the field strength is extended further from the pole face, as shown in FIGS. 15A, 15B, and 15C. Increased field strength, in turn, enhances the power of the motor 30. However, given the cost of rare earth magnets this can make the price of a motor made with such large permanent magnets prohibitively expensive. An alternative mechanism, therefore, to produce a comparable field strength is shown in FIG. 15D. As described above, in FIG. 15D a slice of non-magnetic material 52B is sandwiched between two rare earth magnets 52A to produce a unit having similar flux length with a fraction of the rare earth magnet material and thus a fraction of the cost. In one embodiment the non-magnetized material 52B is a metal such as iron or an iron-containing alloy, such as steel slugs. In another embodiment the material 52B is nickel cobalt. In general the intermediate filler material 52B should have a high permeability capable of the flux density in the permanent magnets 52A. It is worth noting that although the flux density of the sandwiched magnet unit described above will be the same as for a complete magnet of the same dimensions, the coercive strength of the sandwiched unit is diminished slightly compared to the complete magnet. Finally, since the main motivation for providing composite permanent magnets rather than whole magnets is to save money, in practice the cost of whole magnets should be balanced against the cost of assembling the composite magnet components.

The rotor 36 and stator 32 can vary in size relative to one another. In one embodiment the stator 32 has a larger diameter than the rotor 36, permitting the rotor 36 to be situated inside the motor 30 while the structural support for holding the coils 34 of the stator 32 are situated at the periphery of the motor 30.

Similarly, the permanent magnets 52 and electromagnetic coils 34 can have diameters that are different from one another or the same diameter. Regardless of the diameters, however, in a preferred embodiment the centers of the permanent magnets 52 and electromagnetic coils 34 are aligned with one another at the same radial distance from the center of the drive shaft 38 so that the magnetic fields of the respective components are in optimal alignment.

In one embodiment the permanent magnets (or composites as described above) are the same thickness as the rotor so that the same magnet faces outward on opposite sides of the rotor, with the south magnetic pole facing out on one side and the north magnetic pole facing out on the other side.

The power source 40 is preferably any type of conventional direct current (DC) power source that is capable of supplying 30 amps per coil at 48 volts. However, voltage and amperage can be different depending on speed (in RPM) and torque. Speed (in RPM) is voltage-dependent while torque is amperage-dependent. In general the power source 40 should be matched to the gauge of wire that is used to wind the coils 34. For example if the coils 34 are wound with ten-gauge wire, which is rated at thirty amperes, then the power source 40 must be capable of delivering thirty amperes of current for each coil 34 that is active at a given time. Therefore if the motor has six coils 34, all of which may be energized at the same time, then this would require a power source 40 that is capable of providing 180 amps of current. In one embodiment the power source 40 is a twelve-volt automotive battery, although other types of power sources 40 that are capable of providing sufficient amperage at a given direct current (DC) voltage could also be used. Generally, the power source 40 should match the size and power of the motor 30, with smaller motors 30 requiring smaller power sources 40 and larger motors 30 requiring larger power sources 40.

The control mechanism 42 can be any type that is capable of rapidly switching power between coils 34 in the appropriate sequence as the rotors 36 turn. The control mechanism 42 includes a position sensor 80, which employs various position-sensing mechanisms to track the position of the rotors 36, including brushes and physical or optical switches coupled to the drive shaft as shown in U.S. Pat. No. 4,358,693, herein incorporated by reference for all purposes. In addition, magnetic sensors 88 and strips 86, as described above, can also be used. Regardless of the type of position-sensing mechanism that is employed, it is preferred that it be coupled to movement of the rotors 36 in order to track their position, so that charging of the coils 34 can be appropriately coordinated with the movement of the rotors 36. As described above, in one embodiment there is a control wheel 84 fixedly attached to the drive shaft 38, with the position-sensing mechanism being associated with the control wheel 84.

To summarize, any mechanism that can track the position of the rotor and feed this information to a control circuit, which circuit in turn will energize the coils accordingly, can be used with the motor: brushes/commutators; photo sensors; magnetic pickups; cam-driven switches; inductive sensors; and laser sensors. Thus, equally spaced switches, brushes, light cells or other suitable switching means can be used, and that their operation is controlled by suitable lobes or light passages, or elements of other sequencing means.

One preferred feature of the control mechanism 40 is that it should divert power from a coil 34 that is discharging to another coil 34 in the motor 30 that is at the point of being charged up. As a multi-phase motor 30 goes through its cycles the various coils 34 are charged and discharged in accordance with the phase of the motor cycle and the relative positions of the coils and permanent magnets 52.

For example, as the south pole of an electromagnetic coil 34 moves towards the north pole of a permanent magnet 52, there is an attractive force between the electromagnetic coil 34 and permanent magnet 52 that generates force which in turn produces rotational torque in the motor 30. However, when the two magnetic units 34, 52 become aligned the torque-producing force ceases and the attraction between the magnets becomes a drag on the motor 30. To avoid this situation the electromagnetic charge on the coil 34 is released at or before the point when the electromagnetic coil 34 becomes aligned with the permanent magnet 52.

The charge on the coil 34 is released by cutting off the power to the coil 34. The cutting off of power to the coil 34 leads to the electromagnetic field collapsing. Much of the energy released when the field collapses can be recaptured and used to help charge up another coil 34 in the motor 30, preferably one that is just at the point in its cycle of being charged up. In some motors a significant amount of energy is lost and hence dissipated as heat due a failure to capture and utilize collapsing field energy. In addition, the release of energy associated with the collapsing field generates heat, which must be dissipated so that the motor does not overheat, which heat could among other things damage the controller. To improve efficiency and reduce heat build-up, therefore, the collapsing field energy in one embodiment is diverted to a second coil to provide energy to charge the second coil (FIG. 16).

Figure 16:
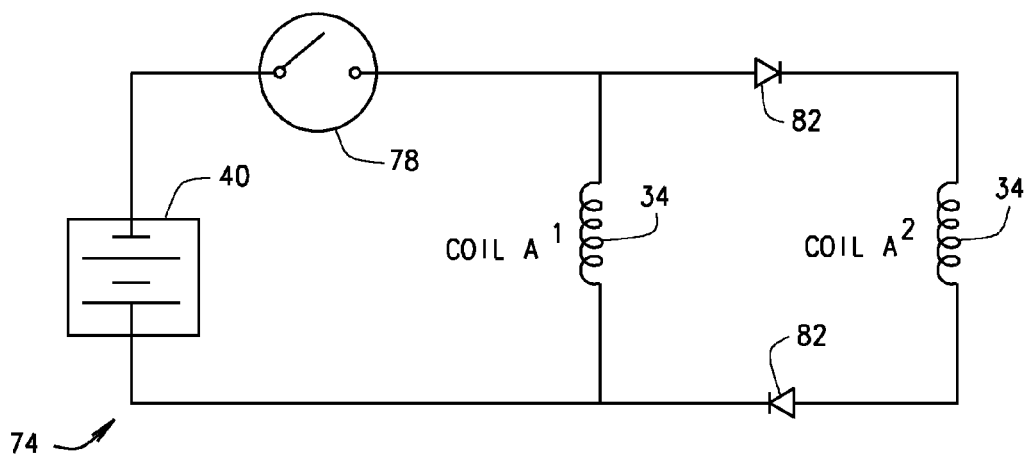
FIG. 16 shows one embodiment of a circuit for shunting collapsing field current from a discharging coil to a charged or charging coil in an electric motor.

In one embodiment the collapsing field energy from one coil 34 is fed to another coil 34 using a circuit 74 such as that shown in FIG. 16. The circuit 74 shown in FIG. 16 uses the voltage generated by the collapsing magnetic field in a first coil to provide the voltage to build current in a second coil in the motor system. This redistribution system increases the efficiency and reduces the amount of power that is converted to heat associated with collapsing fields in motors. In this embodiment, when the switch 78 (which may be a transistor or other suitable switching device) is closed, the power source 40 (e.g. a battery) charges coil A1. When the switch 78 is opened, the collapsing field from coil A1 energizes coil A2. However, due to power losses coil A2 may not be charged as completely as coil A1; thus several coils may be charged in parallel as for coil A1, and the total collapsing field charge from these two or more A1 coils can then be fed into coil A2 to give coil A2 a complete charge equal to what a single coil A1 receives from the power source 40.

Figure 17:
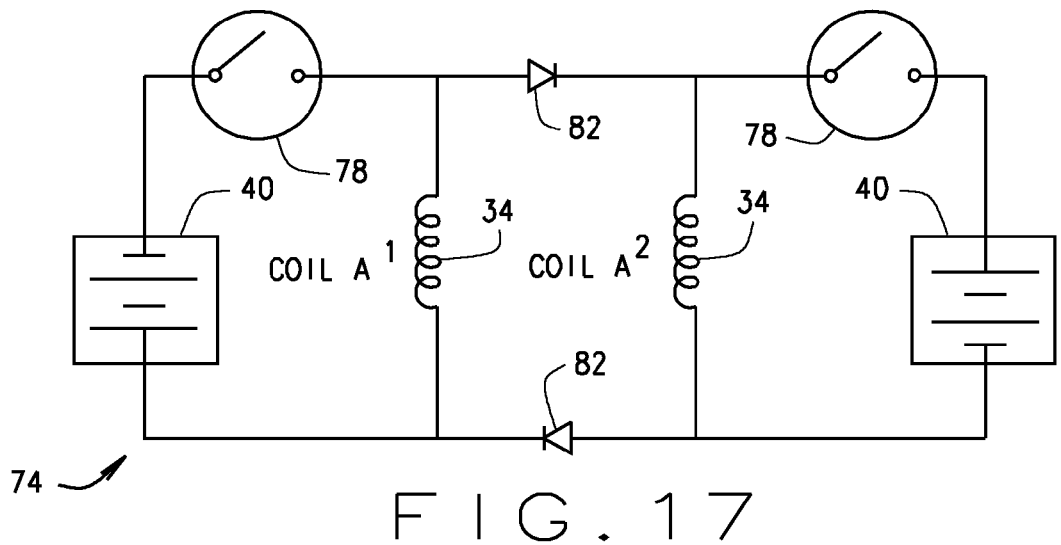
FIG. 17 shows another embodiment of a circuit for shunting collapsing field current from a discharging coil to a charged or charging coil in an electric motor.

Another embodiment of a circuit 74 shown in FIG. 17 is similar to that shown in FIG. 16, except that in this case coil A2 has an additional power source 40 attached to it as well, separate from the first power source 40 attached directly to coil A1. If switches a1 and a2 are alternately opened and closed (always in the opposite configuration from one another, i.e. a1 is open when a2 is closed, and vice versa) then the collapsing field from the coil that has just been disconnected from its respective power source will help to charge the other coil. As for the previous circuit, diodes 82 or other similar devices are inserted into the lines to direct the current in a forward-only direction. In some embodiments, for example for a 'push-pull' type motor configuration, it is necessary to have both switches a1 and a2 closed at the same time for a brief moment during the transitional period to avoid sparking across the switch due to the powerful collapsing field charge. In FIGS. 16 and 17 the coils are always charged with the same electrical polarity each time they are turned on, i.e. it is a so-called 'push-only' configuration.

Figure 18:
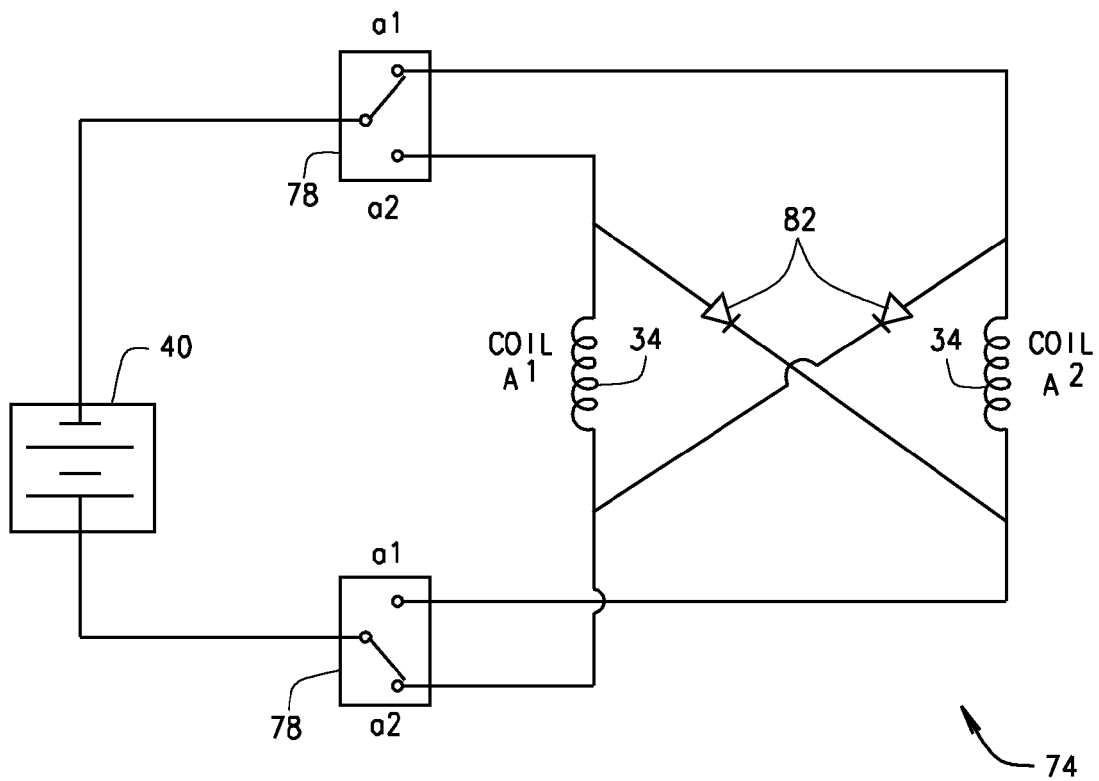
FIG. 18 shows yet another embodiment of a circuit for shunting collapsing field current from a discharging coil to a charged or charging coil in an electric motor.

Finally, FIG. 18 shows another configuration of a circuit 74, similar to the circuit of FIG. 17, in which both coils A1 and A2 can utilize the same power source 40 while also permitting the collapsing field from one coil to be fed to the other coil to help energize the other coil. In the motor 30, this principle can be expanded to whatever number of coils is present in the circuit to permit a motor 30 to be powered by a single power source 40. In addition, the transistors or other switches 78 are coupled to a position sensor 80 that in turn in coupled to movement of the rotor 36 so that the switching on and off of the coils 34 is coordinated with movement of the rotor 36.

In one particular embodiment there are four coils A-D which produce a cascading circuit 74 (FIG. 19). The power source 40 energizes coil A; when coil A is de-energized the collapsing field from coil A energizes Coil B; next the collapsing field from coil B energizes coil C; and finally the collapsing field from coil C energizes coil D. The collapsing field from coil D can then be fed back into coil A to complete the cycle. Each subsequent pulse may be weaker due to resistance loss at each step. However, an input circuit from the power source 40 can be established to replace these losses so that the charging pulse for each coil is sufficiently strong to fully charge the coil.

To make sure that the current flows in the correct direction between coils, diodes 82 are inserted in series with the lines to prevent backflow (FIG. 19). As an alternative to the depicted diodes 82, any switch or device that properly directs the collapsing field to another coil can be used. This ensures that the collapsing field energy always flows to the next diode in the cycle in the 'forward' fashion and does not flow 'backward' to a previous coil.

One embodiment of the principle of feeding the collapsing field energy into other coils of the motor is shown for a three-phase motor such as that depicted in the side view of FIG. 20. In this embodiment the permanent magnets 52 are mounted on the rotors 36 and the electromagnetic coils 34 are mounted on the stators 32 (FIG. 20). In FIG. 20, a rotor 36 and stator 32 are shown superimposed on one another to show the relationship between the two components. The six coils are shown with dashed lines and are labeled A-C, with there being two oppositely-disposed coils of each phase, i.e. two phase A coils, two phase B coils, and two phase C coils. The permanent magnets 52 of the rotor 36 are oriented with their poles (labeled N or S) facing the stator 32, wherein the adjacent permanent magnets 52 are in opposite orientations from one another so that they have alternating polarity around the rotor 36 (FIG. 20). For simplicity a single stator 32 and two adjacent rotors 36 are shown, although in principle multiple adjacent rotors 36 and stators 32 could be assembled to produce even greater power.

Figure 21A:
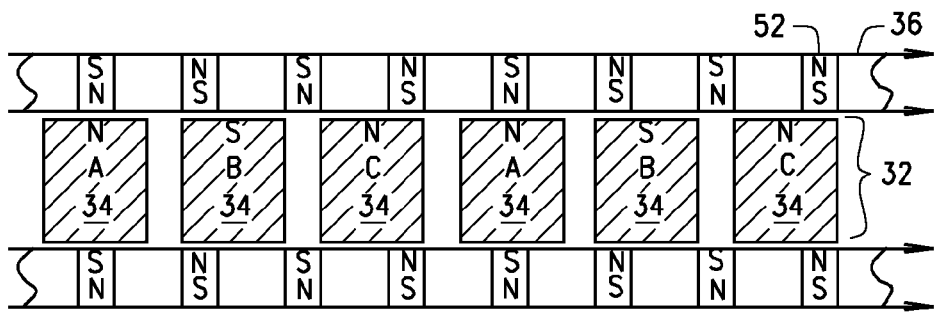
FIGS. 21A-21E show a section through the line 21-21 of FIG. 20 depicting the relative positions of the permanent magnets and the coils in one embodiment of a motor.
Figure 21B:
Figure 21C:
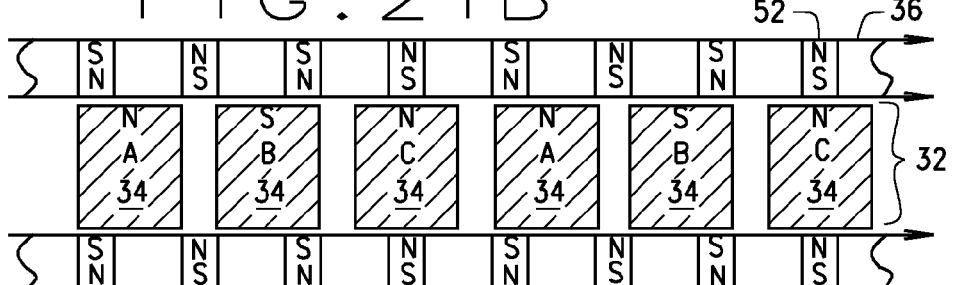
Figure 21D:
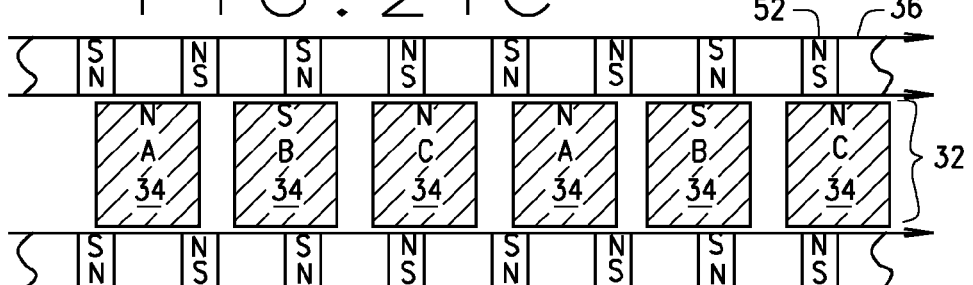
Figure 21E:
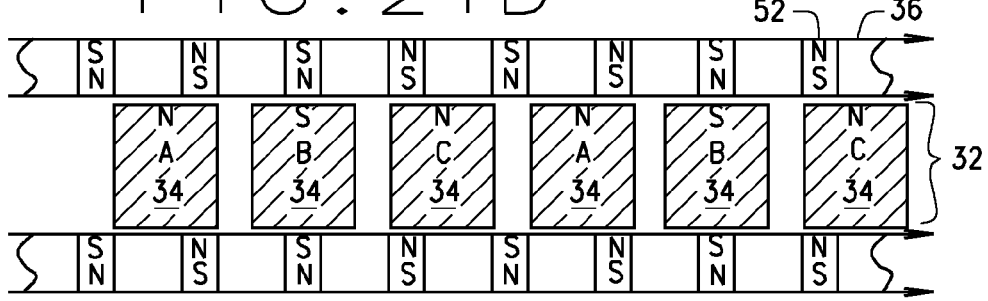

FIGS. 21A-21E shows step-by-step for a three-phase motor how the coils are energized and indicates how the collapsing field from a first coil is fed into a second coil as the second coil is energized. In FIG. 21A, the phase A coils are in the process of switching and the phase B and C coils are energized. At this point the collapsing fields from the phase A coils can be fed into either or both of the phase B and C coils. In FIG. 21B, the coils of all three phases A-C are energized. In FIG. 21C, the phase A and B coils are energized while the phase C coils are in the process of switching. At this point the collapsing fields from the phase C coils can be fed into either or both of the phase A and B coils. In FIG. 21D, the coils of all three phases A-C are energized once again. Finally, in FIG. 21E the phase A and C coils are energized while the phase B coils are switching. At this point the collapsing fields from the phase B coils can be fed into either or both of the phase A and C coils.

Although the example above is shown for a three-phase motor, these principles can in fact be applied to a motor having any phase of two or greater.

The electric motor 30 described herein preferably is controlled as a multiphase motor. To produce a multiphase motor 30 there are coils 34 situated at various points around the stator 32. These coils 34 are turned on in a particular sequential pattern, which in some cases includes reversing the polarity of the electrical charge to reverse the magnetic polarity at each stage. In a preferred embodiment there are matched pairs of coils 34 on opposite sides of the stator 32 that are energized together at the same points in the motor cycle, i.e. they are in phase with one another. For example in a three-phase motor there are preferably six coils, where the pairs of coils on the diametrically opposite sides of the stator (180 degrees apart) may be energized together. Nonetheless, each phase could comprise more coils, for example three coils could be grouped into each phase, which for a three-phase motor would require a total of nine coils. In this case the coils belonging to a given phase would be spaced equally around the stator, 120 degrees apart. Although the concepts disclosed herein can be used to construct a motor having two or more phases, in a preferred embodiment the motor has three or more phases to more easily accommodate transferring the power from a discharging coil to a charging coil.

In one embodiment, referred to as a "push-only" motor, the electrical polarity of the coil 34 is the same each time it is energized, meaning that the magnetic polarity is also the same each time the coil 34 is energized. In another embodiment the electrical, and hence magnetic, polarity is reversed each time the coil is energized. In this latter embodiment, which is sometimes referred to as a "push-pull" embodiment, the motor can generate more power since each coil is active twice as often, either pulling a nearby magnet toward the coil or pushing a nearby magnet away from the coil. Nonetheless, the motor is still operational whether the coils have a uniform polarity or a reversing polarity.

The number of permanent magnets on the rotors determines the fraction of the rotation of the rotor that each phase lasts. For example, if there are eight permanent magnets distributed around the rotor, each phase lasts for one-eighth of a rotation, corresponding to 45 degrees of rotation. Similarly, when there are ten permanent magnets each phase lasts $\frac{1}{10}$.sup.th of the rotation, or 36 degrees of rotation, and when there are twelve permanent magnets each phase is 30 degrees of rotation.

Figure 22A:
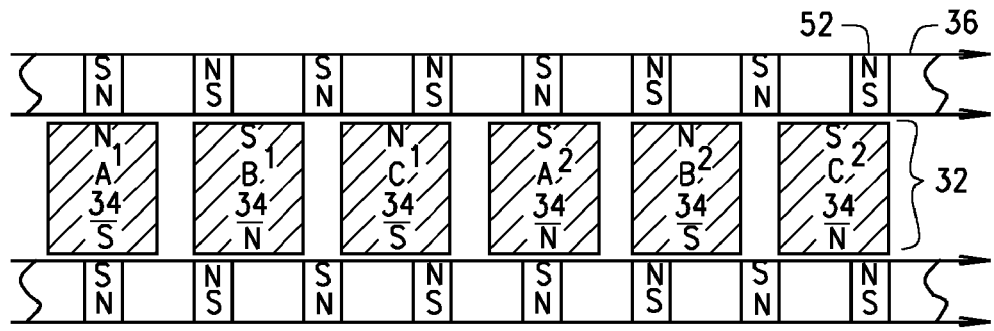
FIGS. 22A-22C show a section through the line 21-21 of FIG. 20 depicting the relative positions of the permanent magnets and the coils in another embodiment of a motor.
Figure 22B:
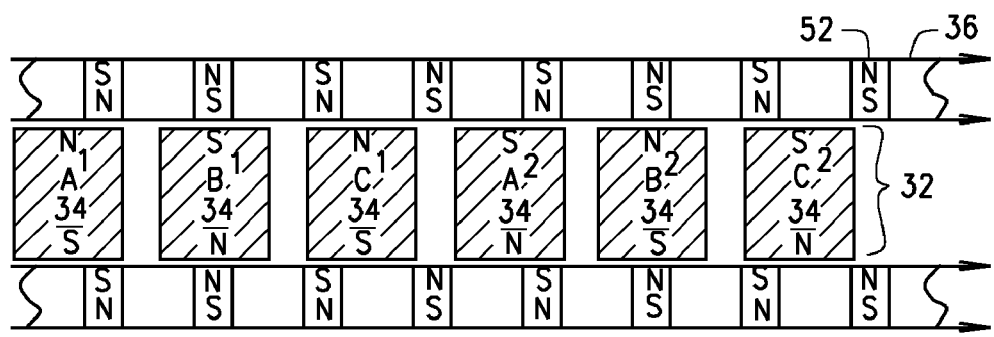
Figure 22C:
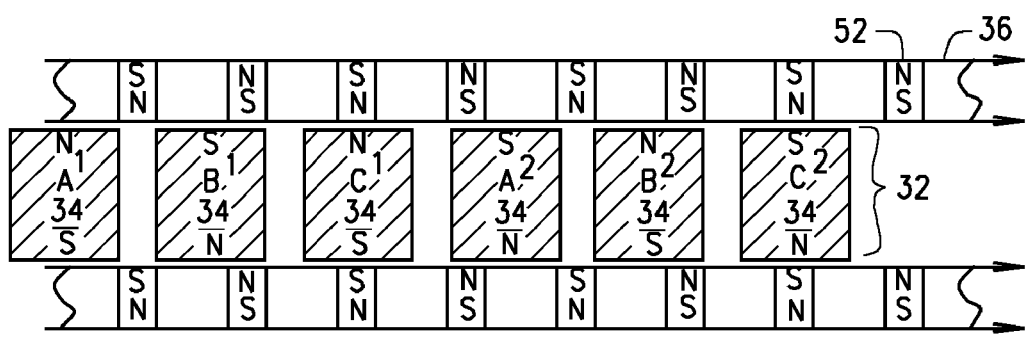

FIGS. 22A, 22B, and 22C show a linear representation of the relationship between the permanent magnets 52 and electromagnetic coils 34 in a three-phase motor 30 having six coils 34 and eight permanent magnets 52. The diagram is a section along a circular line running through the center of each of the coils 34 and permanent magnets 52. The permanent magnets 52 are mounted on the rotors 36 and the coils 34 are on the stator 32. The diagram shows two rotors 36 adjacent to one stator 32, although the basic principles can be extended to any number of rotors and stators. Preferably, however, the rotors 36 are the last elements at either end of a stack of rotors and stators.

As shown in FIGS. 22A, 22B, and 22C the permanent magnets 52 are arranged with alternating polarity. In a preferred embodiment the motor 30 has an even number of permanent magnets 52 so that the polarity of the permanent magnets 52 alternates continuously around the rotor 36. In the depicted embodiment the coils 34 are only energized with a single polarity, so that the coil 34 is either energized with that one polarity or not energized. In the embodiment shown, the paired coils 34, which are in the same phase but on opposite sides of the stator, are energized with opposite polarity from one another so that the magnetic polarities are reversed relative to one another.

FIG. 23 shows a timing diagram for a motor 30 such as the one shown in linear representation in FIGS. 22A, 22B, and 22C. At the top of the figure there is a number line marked off in fifteen degree increments corresponding to the rotational cycle of the rotors 36. Thus, the lines associated with each phase below this number line shows how the phases relate to the position of rotors 36. At each phase the matched opposite coils 34 are turned on or off as a pair where the paired coils 34 have opposite electrical and magnetic polarity. For example, when coil 1 is turned on with its magnetic north pole facing in a first direction, the oppositely-disposed coil 4 is off. Later when coil 4 is turned on with its magnetic south pole in the first direction, coil 1 is turned off. As stated above, this motor is sometimes referred to as a "push-only" motor because the coils in this depicted embodiment always have the same polarity when they are energized. Below the phase diagram at the top of FIG. 23 there is shown a side view of a rotor 36 and stator 32, such as the kind depicted in the phase diagram, superimposed on one another. The side view of the motor 30 shows how the positions of the permanent magnets 52 relate to the positions of the coils 34.

Figure 25:
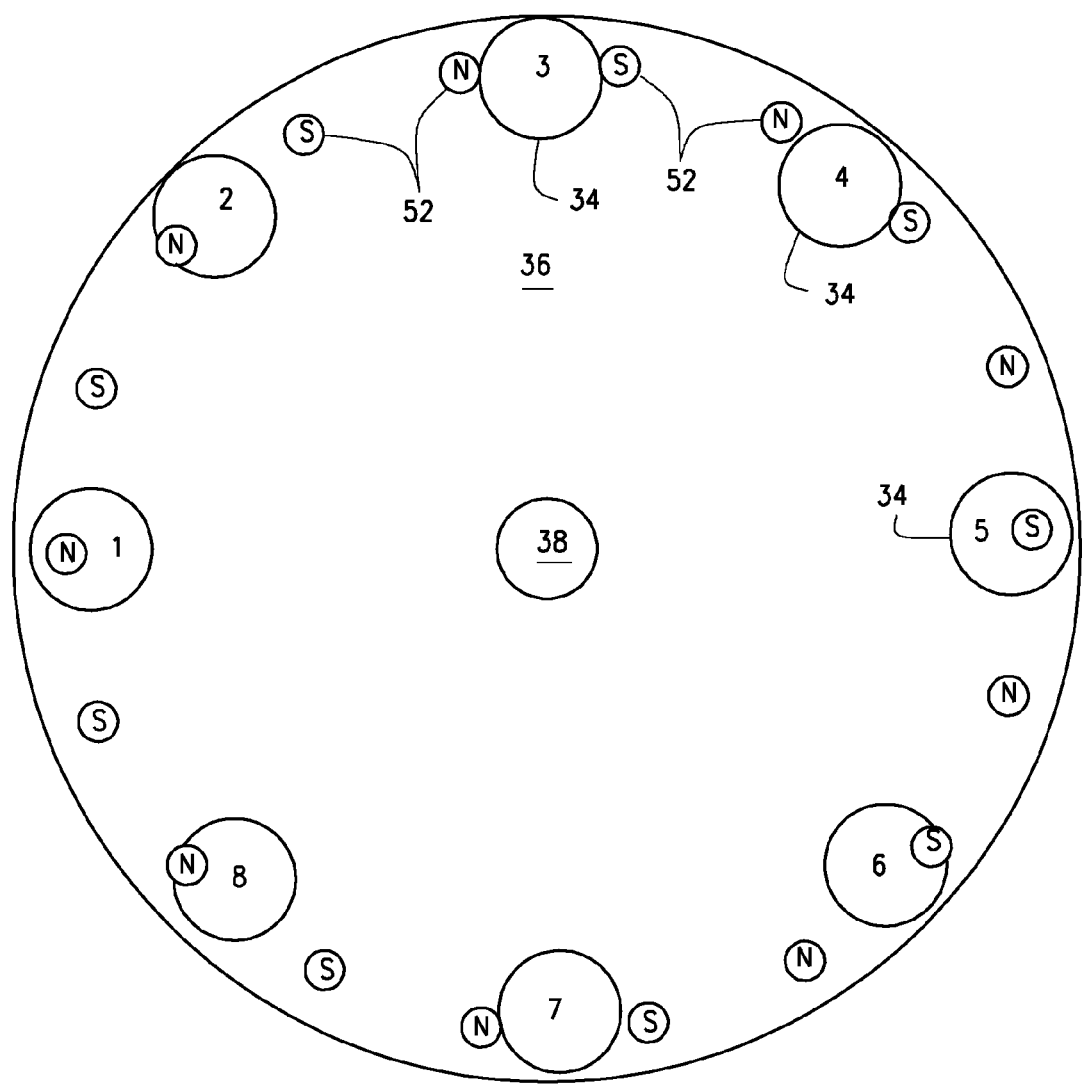
FIG. 25 shows a side view of the permanent magnets and coils of one embodiment of a 4 phase motor having 8 coils and 18 permanent magnets.

FIGS. 24 and 25 show a similar phase diagram and side view for a motor 30 having eighteen permanent magnets 52 in the rotors 36 and eight coils in the stator 32. Again, the coils 34 when energized always have the same polarity so that the motor 30 is of the "push-only" variety. Also, as with the other phase diagram, when the line representing a particular phase is high a first of the paired coils is turned on and a second coil is turned off, and when the line is low the first coil is off and the second is on, with the opposite electrical and magnetic polarity from the first.

In both of the cases described above, as a particular pair of coils transitions between being energized or not, the energy from the coil that is being turned off is fed into the coil that is being turned on, so that the collapsing field energy from one coil can be captured and not be merely dissipated.

It is possible to convert a motor such as either of those described above to a "push-pull" mode, by alternating the polarity of the power used to energize the coils at transition indicated in the phase diagrams, rather than simply switching one coil on and the other off.

In the case of a push-pull configuration the collapsing field energy from each pair of coils is transferred to a different set of coils in the stator, i.e. a set of coils that is in a different phase. However, in this latter push-pull case the coils in the other phases would already be charged when the collapsing field energy is fed to them, so instead of helping to charge up the other coils the collapsing field energy would instead help to maintain the charge.

In one embodiment the control mechanism 42 of the motor 30 includes a programmable microprocessor 43 for controlling charging and discharging of the coils 34 (FIG. 1). The microprocessor 43 receives input from the position sensor 80 and controls the switches 78 in the circuits 74. With the enhanced degree of control that the microprocessor 43 affords, many additional features can be added to the motor 30.

In one embodiment the motor 30 can operate with fewer than all of the coils 34 being operative. For example on a motor having multiple stators 32, individual stators 32 can be turned on or off, thus permitting the motor to generate variable levels of power as needed. If, for example, each stator 32 generates 100 horsepower (hp) and there are five stators 32, then the motor can generate 100, 200, 300, 400, or 500 hp depending on how many stators 32 are activated. In addition, any combination of stators 32 can be activated at a given time, there is no requirement that the stators 32 be adjacent to one another.

In another embodiment, a further degree of control can be achieved by activating groups of coils 34 from different stators 32 while other coils 34 are inactive. For example, on a three-phase motor 30 with three stators 32, one pair of coils 34 can be activated on the first stator 32, another pair on the second stator 32, and another on the third stator 32. To do this, however, requires that the coils 34 be activated in opposing pairs on the same stator 32 and that the pairs of coils 34 each come from different phases of the motor cycle, meaning that they are distributed equally around the circumference of the motor.

While a particular stator 32, or even an individual coil 34 of a stator 32, is inactive, the coils 34 that are inactive can be removed for repair or replacement, even as the motor 30 continues to run.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

The invention claimed is:

1. A stator comprising:
a plurality of wire coils, wherein the wire coils are wound around a non-magnetizable core and attached to a corresponding mounting bracket; and
a plurality of stator frame components;
wherein each mounting bracket is coupled to a stator frame component to form a stator frame assembly having a series of wire coils mounted in a circle such that the wire coils are in a plane parallel to a plane of rotation of a rotor; and
wherein each wire coil can be removed from the stator independently of other wire coils.

2. The stator of claim 1, wherein the series of wire coils is a first series of wire coils spaced apart along the stator frame components from a second series of wire coils so as to leave room therebetween for the rotor.

3. The stator of claim 1, wherein the wire coils are molded with a resin.

4. The stator of claim 1, wherein the stator frame components are aluminum longitudinal strips.

5. The stator of claim 1, wherein the stator frame components comprise a series of notches formed therein for locating the wire coils at predetermined positions and in a predetermined orientation.

6. The stator of claim 1, wherein ends of the stator frame components are attached to end plates.

7. The stator of claim 1, wherein wire leads from each of the wire coils are led through the corresponding mounting bracket.

8. The stator of claim 1, wherein the stator frame components are longitudinal strips having a wire channel formed therein; and wherein wire leads from each of the wire coils are fed through a corresponding slot formed on a long edge of the longitudinal strips.

9. A method of manufacturing a stator, the method comprising:
providing a plurality of wire coils, wherein the wire coils are wound around a non-magnetizable core and attached to a corresponding mounting bracket;
providing a plurality of stator frame components; and
coupling each mounting bracket to a stator frame component to form a stator frame assembly having a series of wire coils mounted in a circle such that the wire coils are in a plane that is parallel to a plane of rotation of a rotor and such that each wire coil can be removed from the stator independently of other wire coils.

10. The method of claim 9, wherein the plurality of wire coils is a first plurality of wire coils, the method further comprising:
providing a second plurality of wire coils wound around corresponding non-magnetizable cores and attached to corresponding mounting brackets; and
coupling the mounting brackets corresponding to the second plurality of wire coils to the stator frame components at positions spaced apart from the first plurality of wire coils and along the stator frame components so as to leave room between the first plurality of coils and the second plurality of coils for the rotor.

11. The method claim 9, wherein providing the plurality of wire coils comprises forming a plurality of wire coils molded with a resin.

12. The method of claim 9, wherein providing the plurality of stator frame components comprises providing aluminum longitudinal strips.

13. The method of claim 9, wherein providing the stator frame components comprises forming a series of notches in the stator frame components for locating the wire coils at predetermined positions and in a predetermined orientation.

14. The method of claim 9, further comprising attaching ends of the stator frame components to end plates.

15. The method of claim 9, further comprising feeding wire leads from each of the wire coils through the corresponding mounting bracket.

16. The method of claim 9, further comprising forming a wire channel in the stator frame components; forming slots along a long edge of the longitudinal strips, each slot corresponding to one of the plurality of wire coils; and feeding wire leads from each of the wire coils through the corresponding slot into the wire channel.

* * * * *

UNITED STATES PATENT AND TRADEMARK OFFICE
CERTIFICATE OF CORRECTION

PATENT NO. : 8,334,634 B2
APPLICATION NO. : 13/488321
DATED : December 18, 2012
INVENTOR(S) : Robert A. Palmer, Jr. et al.

It is certified that error appears in the above-identified patent and that said Letters Patent is hereby corrected as shown below:

Title Page 1, column 1 (Inventors), delete "Robert A. Palmer," and insert -- Robert A. Palmer, Jr., --, therefore.

column 18, line 10, after "method" insert -- of --, therefore.

Signed and Sealed this
Second Day of April, 2013

Teresa Stanek Rea
*Acting Director of the United States Patent and Trademark Office*